United States Patent
Olson

(10) Patent No.: US 11,665,182 B2
(45) Date of Patent: May 30, 2023

(54) COALITION NETWORK IDENTIFICATION USING CHARGES ASSIGNED TO PARTICLES

(71) Applicant: Verizon Media Inc., New York, NY (US)

(72) Inventor: Timothy Michael Olson, Mahomet, IL (US)

(73) Assignee: Yahoo Assets LLC, New York, NY (US)

( * ) Notice: Subject to any disclaimer, the term of this patent is extended or adjusted under 35 U.S.C. 154(b) by 295 days.

(21) Appl. No.: 17/168,222

(22) Filed: Feb. 5, 2021

(65) Prior Publication Data

US 2022/0255952 A1 Aug. 11, 2022

(51) Int. Cl.
*H04L 9/40* (2022.01)
(52) U.S. Cl.
CPC ................ *H04L 63/1416* (2013.01)
(58) Field of Classification Search
CPC ............ H04L 63/1416; H04W 12/12
See application file for complete search history.

(56) References Cited

U.S. PATENT DOCUMENTS

| 2018/0039688 A1* | 2/2018 | Ahn | G06F 16/9024 |
| 2020/0296118 A1* | 9/2020 | Chaula | H04L 63/1425 |
| 2022/0086256 A1* | 3/2022 | Stram | H04L 67/306 |

* cited by examiner

*Primary Examiner* — Daniel B Potratz
*Assistant Examiner* — Matthias Habtegeorgis
(74) *Attorney, Agent, or Firm* — Cooper Legal Group LLC

(57) ABSTRACT

One or more computing devices, systems, and/or methods are provided. Event information associated with a plurality of events may be identified. The plurality of events may be associated with first entities corresponding to a first entity type and second entities associated with a second entity type. A first network profile associated with the first entities and the second entities may be generated based upon the event information. An arrangement of particles corresponding to the first entities and the second entities may be generated. Charges associated with the particles may be determined based upon the first network profile. The particles may be rearranged to a second arrangement of particles based upon the charges. One or more clusters of particles in the second arrangement of particles may be identified. One or more coalition networks associated with fraudulent activity may be identified based upon the one or more clusters of particles.

20 Claims, 14 Drawing Sheets

COALITION NETWORK IDENTIFICATION USING CHARGES ASSIGNED TO PARTICLES

BACKGROUND

Many applications, such as websites, applications, etc. may provide platforms for viewing media. For example, a request for media may be received from a device associated with a user. Responsive to receiving the request for media, media may be transmitted to the device. However, the request for media may be fraudulent.

SUMMARY

In accordance with the present disclosure, one or more computing devices and/or methods are provided. In an example, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the first entity and one or more entities comprising the second entity. The second plurality of entities may comprise the one or more entities. A first set of event metrics of the one or more first sets of event metrics may correspond to a measure of events associated with the first entity and the second entity. An arrangement of a plurality of particles in a space may be generated. A first particle of the plurality of particles may correspond to the first entity of the first plurality of entities and a second particle of the plurality of particles may correspond to the second entity of the second plurality of entities. A plurality of charges associated with the plurality of particles may be determined based upon the first network profile. A first charge of the plurality of charges may be assigned to the first particle of the plurality of particles and a second charge of the plurality of charges may be assigned to the second particle of the plurality of particles. The plurality of particles may be rearranged based upon the plurality of charges to generate a second arrangement of the plurality of particles in the space. One or more first clusters of particles in the second arrangement of the plurality of particles in the space may be identified. A coalition network associated with fraudulent activity may be identified based upon a first cluster of particles of the one or more first clusters of particles.

In accordance with the present disclosure, one or more computing devices and/or methods are provided. In an example, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the first entity and one or more entities comprising the second entity. The second plurality of entities may comprise the one or more entities. A first set of event metrics of the one or more first sets of event metrics may correspond to a measure of events associated with the first entity and the second entity. An arrangement of a plurality of particles in a space may be generated. A first particle of the plurality of particles may correspond to the first entity of the first plurality of entities and a second particle of the plurality of particles may correspond to the second entity of the second plurality of entities. A plurality of charges associated with the plurality of particles may be determined based upon the first network profile. A first charge of the plurality of charges may be assigned to the first particle of the plurality of particles and a second charge of the plurality of charges may be assigned to the second particle of the plurality of particles. The plurality of particles may be rearranged based upon the plurality of charges to generate a second arrangement of the plurality of particles in the space. One or more first clusters of particles in the second arrangement of the plurality of particles in the space may be identified. A graphical representation of the second arrangement of the plurality of particles may be generated. The graphical representation may comprise indications of the one or more first clusters of particles.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
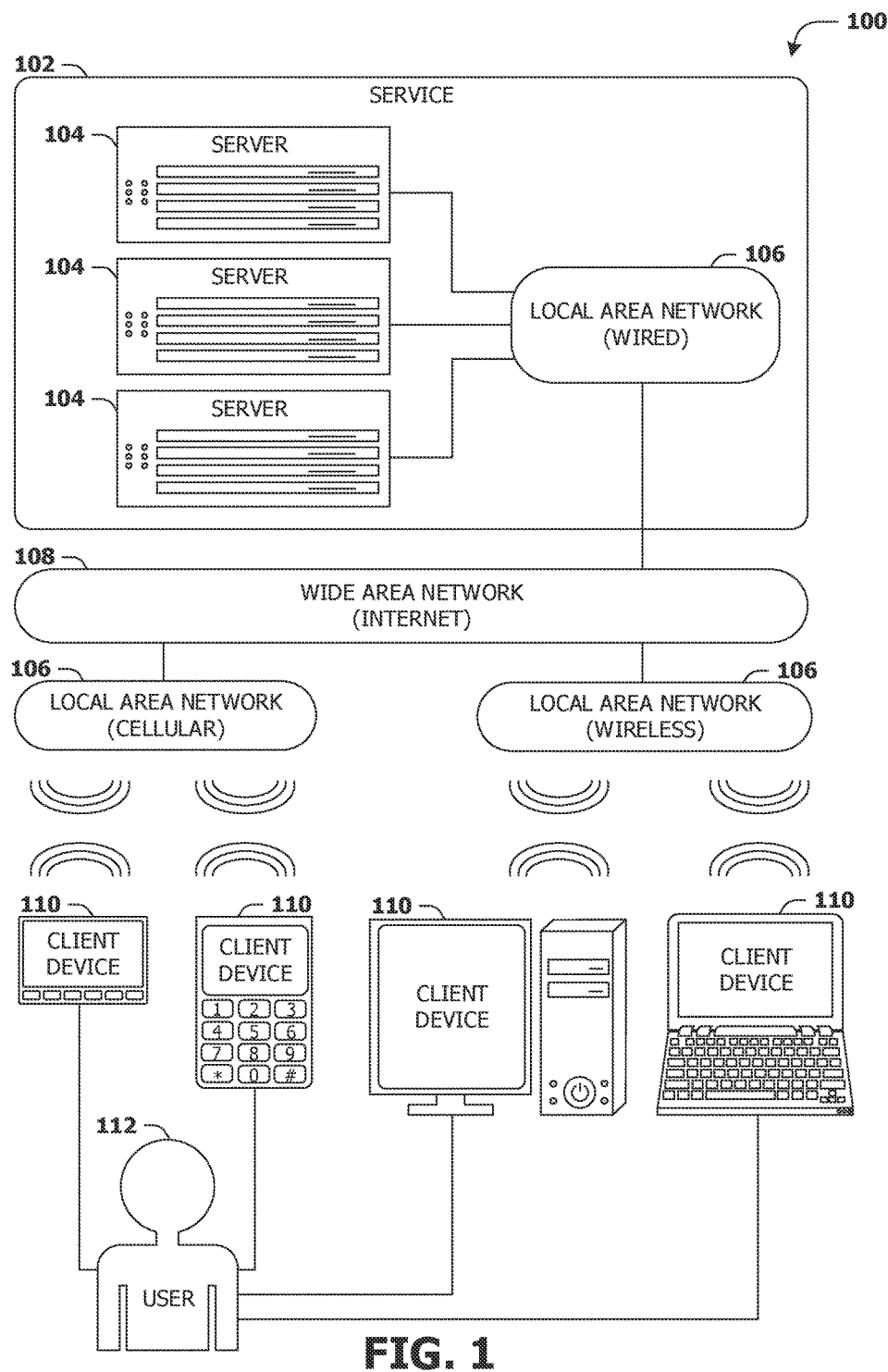
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE)

Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
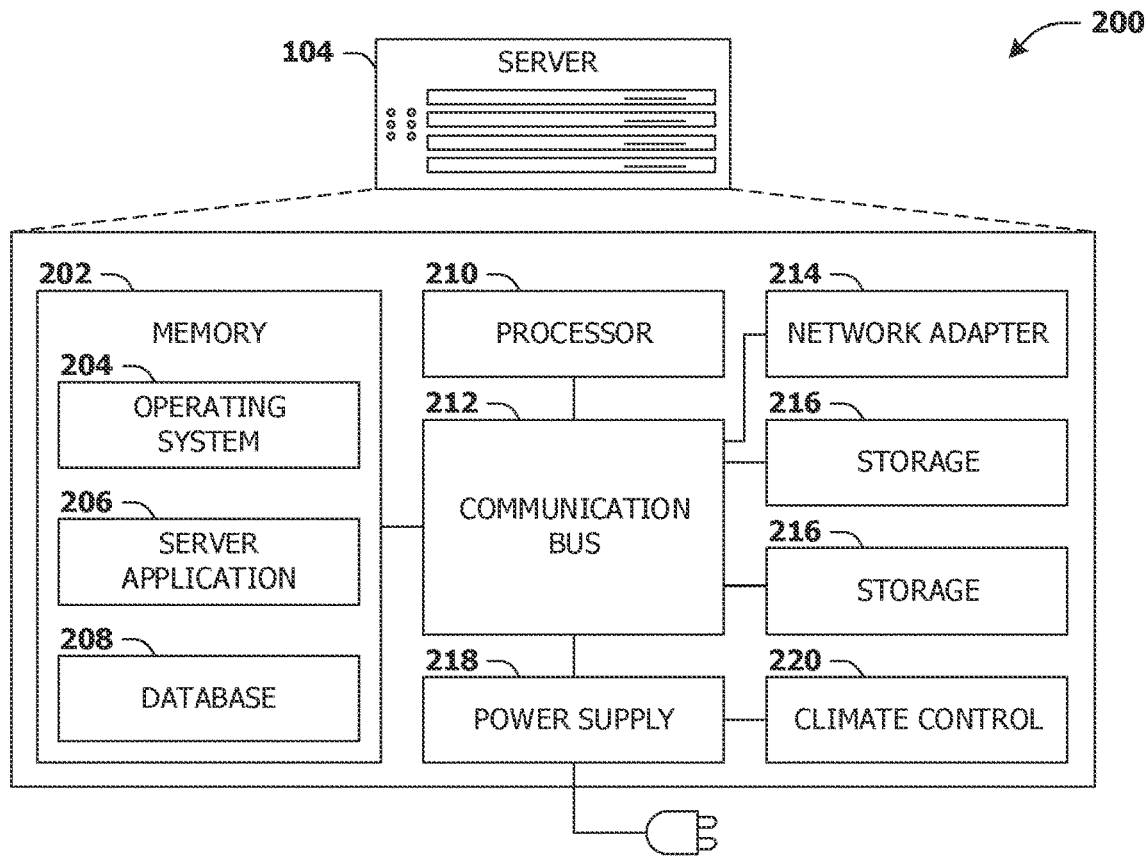
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
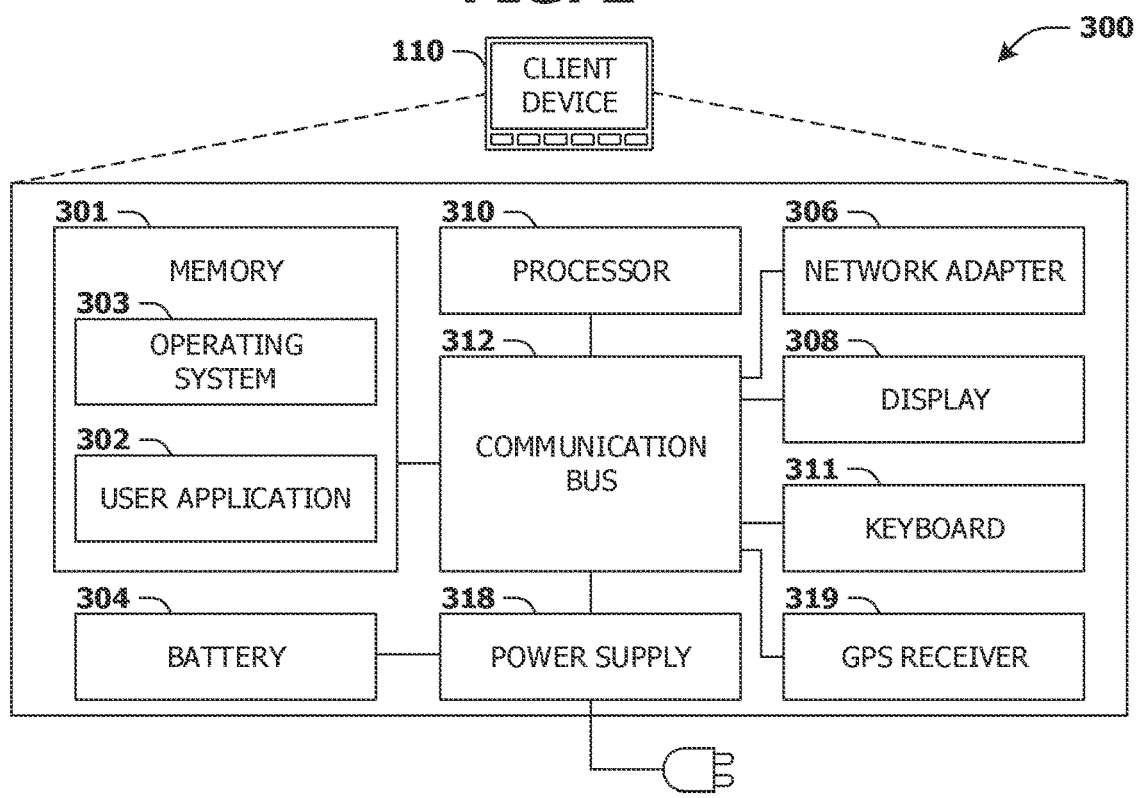
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for identifying coalition networks associated with fraudulent activity are provided. A coalition network is a network of entities, such as internet resources (e.g., websites, web pages, domains, applications, etc.) and/or clients (e.g., client devices, IP addresses, etc.), working together to perform fraudulent activity. An example of such fraudulent activity may include, but is not limited to, advertising fraud. Other examples of fraudulent activity performed by coalition networks are data fraud, spam messaging, etc. In advertising fraud, advertisement signals associated with internet resources and clients of the coalition network may be received by an advertising system. The advertisement signals may indicate advertisement impressions, clicks, conversions, etc. performed by a client of the coalition network in association with an internet resource of the coalition network. However, the purported advertisement impressions, clicks, conversions, etc. may not be performed by legitimate users having an interest in relevant advertisements. Rather, the advertisement signals may be transmitted to the advertising system by a system of the coalition network employing at least one of botnets, hacked client devices (e.g., zombie computers), click farms, fake websites, data centers, etc. Administrators of the coalition network may request compensation for the purported advertisement impressions, clicks, conversions, etc., and, unless the coalition network is identified and determined to perform fraudulent activity, the administrators may continue being compensated. Advertising fraud is estimated to cost the advertising industry billions of dollars per year and automated and/or real-time solutions to advertising fraud are needed.

Some systems for detecting fraudulent activity attempt to detect fraud at an entity-level and/or an event-level. For example, such systems may analyze activity and/or traffic associated with a device and/or an advertisement signal to determine, such as based upon computation limits, whether the device and/or the advertisement signal is fraudulent. However, malicious entities develop workarounds to avoid detection by such systems, such as by using automated programs to spread fraudulent traffic across networks of compromised or malicious systems (e.g., botnets). For example, the automated programs may operate such that each individual bot looks sufficiently like a legitimate user in order to avoid triggering event-level and/or entity-level detectors.

Accordingly, there is a need for techniques and systems for detecting fraudulent activity on a network-level. Thus, in accordance with one or more of the techniques presented herein, a first plurality of sets of event information associated with a first plurality of events may be identified. The first plurality of events may be associated with a first plurality of entities corresponding to a first entity type and a second plurality of entities corresponding to a second entity type. A first set of event information of the first plurality of sets of event information may be associated with a first event of the first plurality of events. The first set of event information may be indicative of a first entity, of the first plurality of entities, associated with the first event. The first set of event information may be indicative of a second entity, of the second plurality of entities, associated with the first event. A first network profile associated with the first plurality of entities and the second plurality of entities may be generated based upon the first plurality of sets of event information. The first network profile may be indicative of one or more first sets of event metrics associated with the first entity and one or more entities comprising the second entity. An arrangement of a plurality of particles in a space (e.g., at least one of a box, a simulation space, a simulation box, etc.) may be generated. The plurality of particles may be associated with entities of the first plurality of entities and/or the second plurality of entities. Charges, determined based upon the first network profile, may be assigned to particles of the plurality of particles. For example, the charges may comprise repulsive charges (associated with repulsive forces between particles) and/or attractive charges (associated with attractive forces between particles). The plurality of particles may be rearranged based upon the charges to generate a second arrangement of the plurality of particles in the space. In some examples, the plurality of particles may be rearranged by performing a simulation (e.g., a force simulation) based upon at least one of the charges, initial positions of the plurality of particles (such as positions of the plurality of particles corresponding to the arrangement of the plurality of particles), a resistance, an initial velocity of particles of the plurality of particles, etc. For example, the simulation may be performed according to physics principles. In some examples, in the second arrangement, particles corresponding to entities that are less closely related to each other (with respect to events of the first plurality of events and/or other internet activity, for example) may be further apart from each other than particles corresponding to entities that are more closely related to each other. A coalition network associated with fraudulent activity may be identified based upon the second arrangement of particles. For example, the coalition network may be identified based upon a cluster of particles identified in the second arrangement. The coalition network may comprise entities (of the first plurality of entities and/or the second plurality of entities, for example) corresponding to particles of the cluster of particles. In an example, particles, associated with entities of the coalition network, clustering to form the cluster of particles in the second arrangement may indicate that the entities act in a coordinated and/or distributed manner to perform fraud. It may be determined that the entities corresponding to the cluster of particles are part of the coalition network associated with fraudulent activity if one or more first conditions, associated with the cluster of particles and/or the entities, are met.

Figure 4:
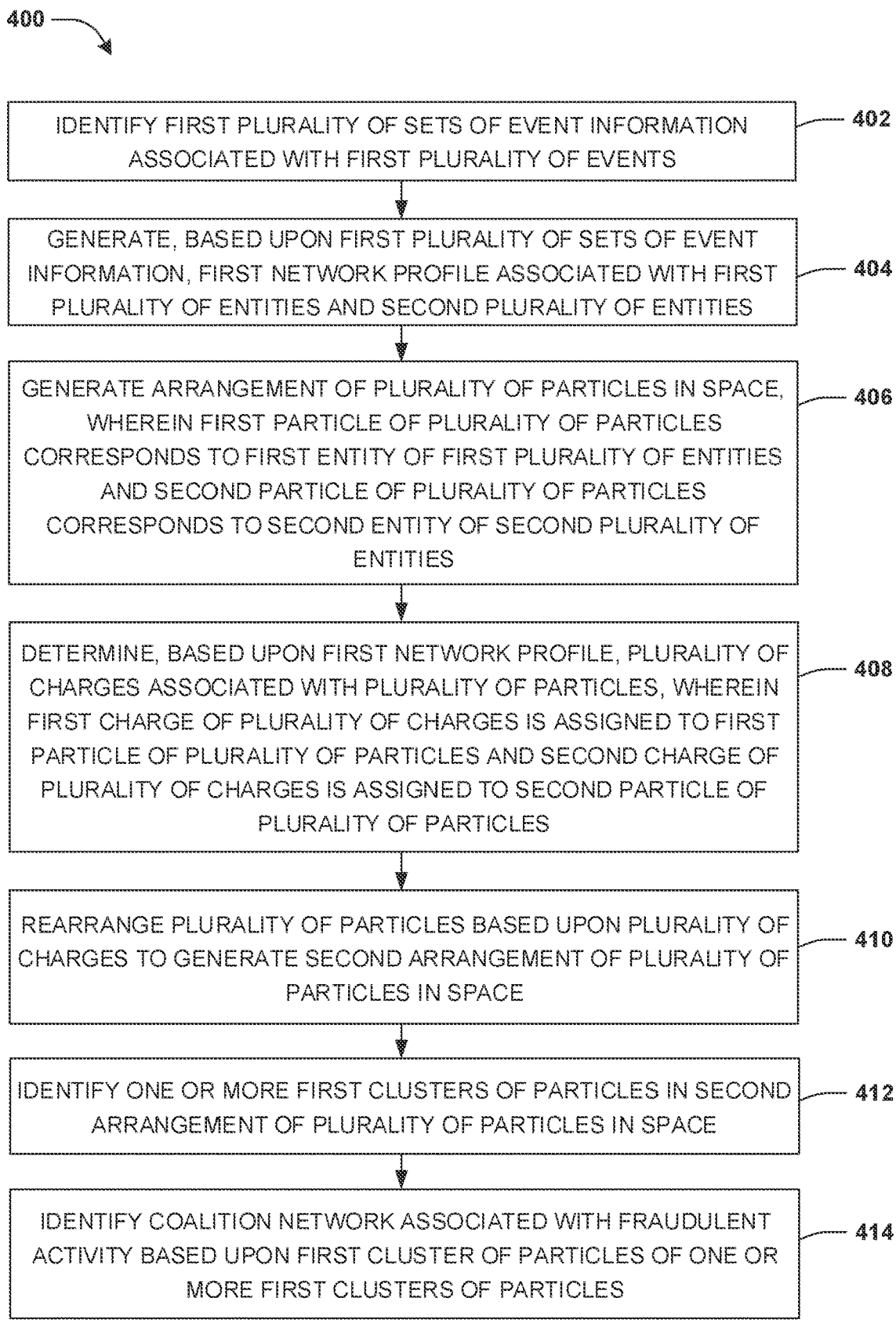
FIG. 4 is a flow chart illustrating an example method for identifying coalition networks.

An embodiment of identifying coalition networks is illustrated by an example method 400 of FIG. 4. A content system for presenting content via devices may be provided. In some examples, the content system may be an advertisement system (e.g., an online advertising system). Alternatively and/or additionally, the content system may not be an advertisement system. In some examples, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

At 402, a first plurality of sets of event information associated with a first plurality of events may be identified. The first plurality of events may be associated with a first plurality of entities corresponding to a first entity type and a second plurality of entities corresponding to a second entity type. In some examples, the first plurality of events may correspond to events that occur within a first period of time.

In some examples, the first plurality of entities corresponds to client-side (and/or user-side) entities. For example, an entity of the first plurality of entities may be associated with a client device. The first entity type may correspond to at least one of a client device, a device identifier associated with a device, an IP address associated with a device, a media access control (MAC) address associated with a device, a carrier identifier indicative of carrier information associated with a device, a user identifier (e.g., at least one of a username, an email address, a user account identifier, etc.) associated with a device, a browser cookie (and/or a cookie identifier associated with a device), etc.

In some examples, the second plurality of entities corresponds to internet resource-side (and/or publisher-side) entities. For example, an entity of the second plurality of entities may be associated with an internet resource, such as at least one of a web page, a website, an application (e.g., a client application, a mobile application, a platform, etc.). The second entity type may correspond to at least one of an internet resource, an internet resource identifier associated with an internet resource, a host device associated with an internet resource (e.g., the host device may comprise one or more computing devices, storage and/or a network configured to host the internet resource), a host identifier of the host device, a domain (e.g., a domain name, a top-level domain, etc.) associated with an internet resource, an application identifier associated with an application, a publisher identifier associated with a publisher of an internet resource, etc.

In some examples, an event of the first plurality of events (and/or each event of the first plurality of events) may correspond to activity performed by an entity of the first plurality of entities and/or an entity of the second plurality of entities. In an example, an event of the first plurality of events (and/or each event of the first plurality of events) may correspond to a presentation of a content item (e.g., presentation of an advertisement and/or an advertisement impression), a selection of the content item (e.g., an advertisement click), and/or a conversion event associated with the content item, where the content item may be provided by the content system.

A first set of event information of the first plurality of sets of event information may be associated with a first event of the first plurality of events. The first set of event information may be indicative of a first entity (e.g., a client-side entity), of the first plurality of entities, associated with the first event. The first set of event information may be indicative of a second entity (e.g., an internet resource-side entity), of the second plurality of entities, associated with the first event.

FIGS. 5A-5I illustrate examples of a system 501 for identifying coalition networks, described with respect to the method 400 of FIG. 4. FIGS. 5A-5E illustrate examples of the first event associated with the first entity and the second entity. The first entity may be associated with a first client device 500 associated with a first user. The second entity may be associated with one or more first internet resources comprising a fourth web page 544 (illustrated in FIG. 5E). In an example, where the second entity corresponds to a domain, the one or more first internet resources may correspond to one or more web pages matching the domain. The first user (and/or the first client device 500) may access and/or interact with a service, such as a browser, software, a website, an application, an operating system, an email interface, a messaging interface, a music-streaming application, a video application, etc. that provides a platform for accessing internet resources and/or viewing and/or downloading content from a server associated with the content system. In some examples, the content system may use device information associated with the first client device 500, such as at least one of activity information associated with the first client device 500, demographic information associated with the first user, location information associated with the first client device 500, etc. to select content for presentation to the first user.

Figure 5A:
FIG. 5A is a component block diagram illustrating an example system for identifying coalition networks, where a first client device presents and/or accesses a first web page using a browser.

FIG. 5A illustrates the first client device 500 presenting and/or accessing a first web page 508 using a browser of the first client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
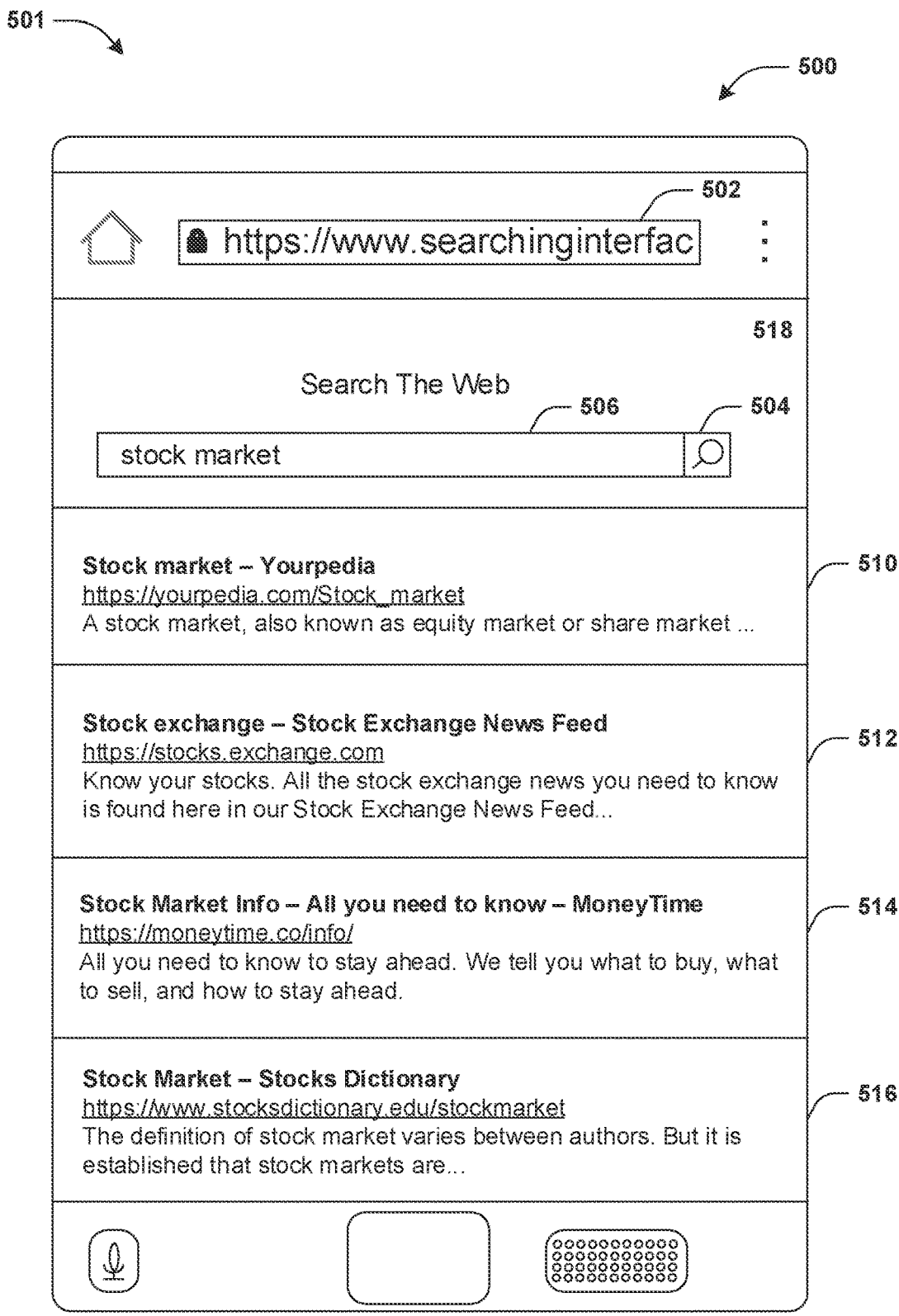
FIG. 5B is a component block diagram illustrating an example system for identifying coalition networks, where a first client device presents a plurality of search results associated with a query.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to the fourth web page 544 (illustrated in FIG. 5E), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

Figure 5C:
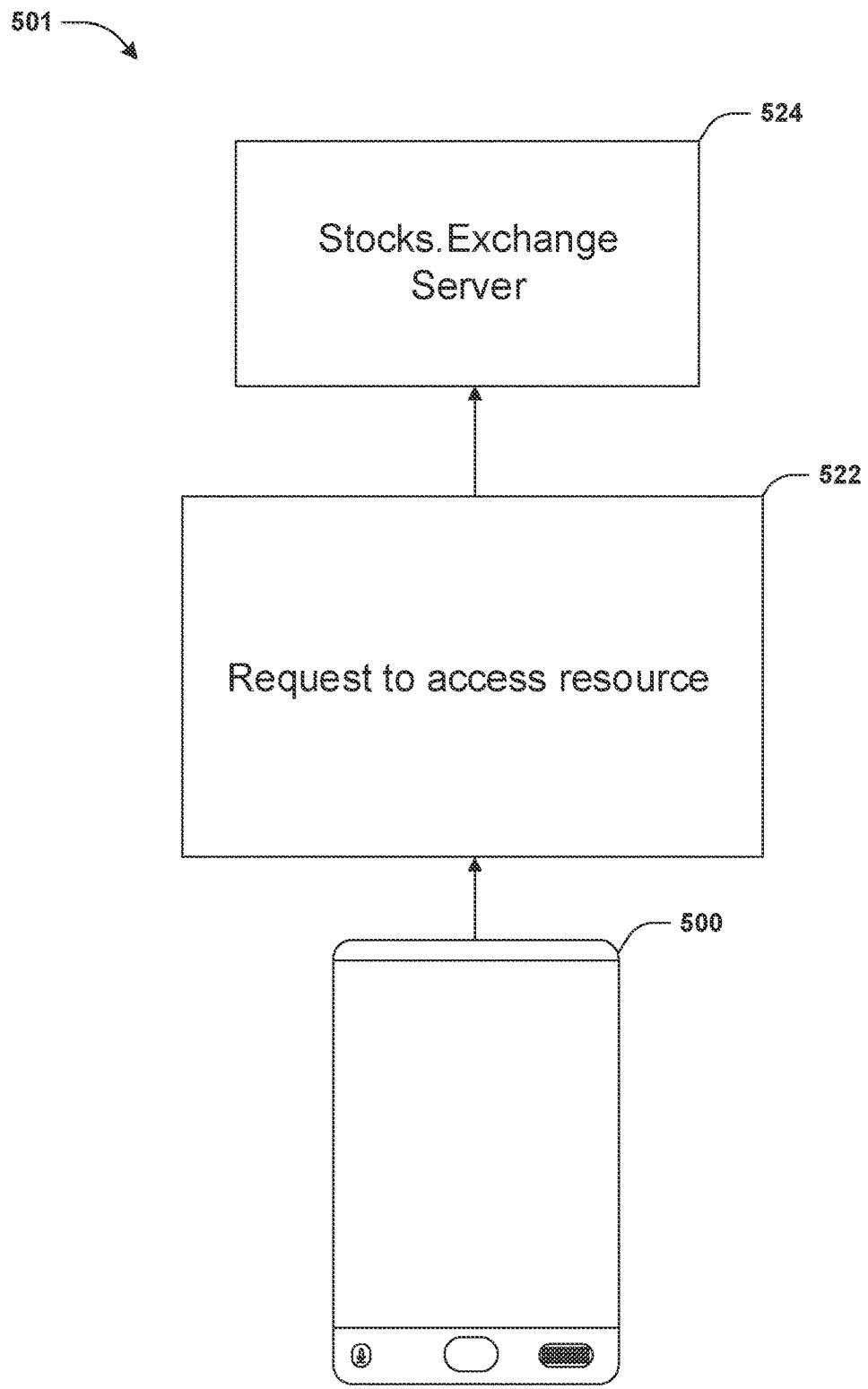
FIG. 5C is a component block diagram illustrating an example system for identifying coalition networks, where a first client device transmits a request to access a resource to a server.

FIG. 5C illustrates the first client device 500 transmitting a request 522 to access a resource to a first server 524. In some examples, the request 522 to access the resource may be transmitted responsive to the second search result 512 being selected. For example, the resource may correspond to the fourth web page 544. For example, the request 522 to access the resource may comprise an indication of the fourth web page 544 (e.g., a web address "https://stocks.exchange-.com"). Alternatively and/or additionally, the first server 524 may be associated with the fourth web page 544.

Figure 5D:
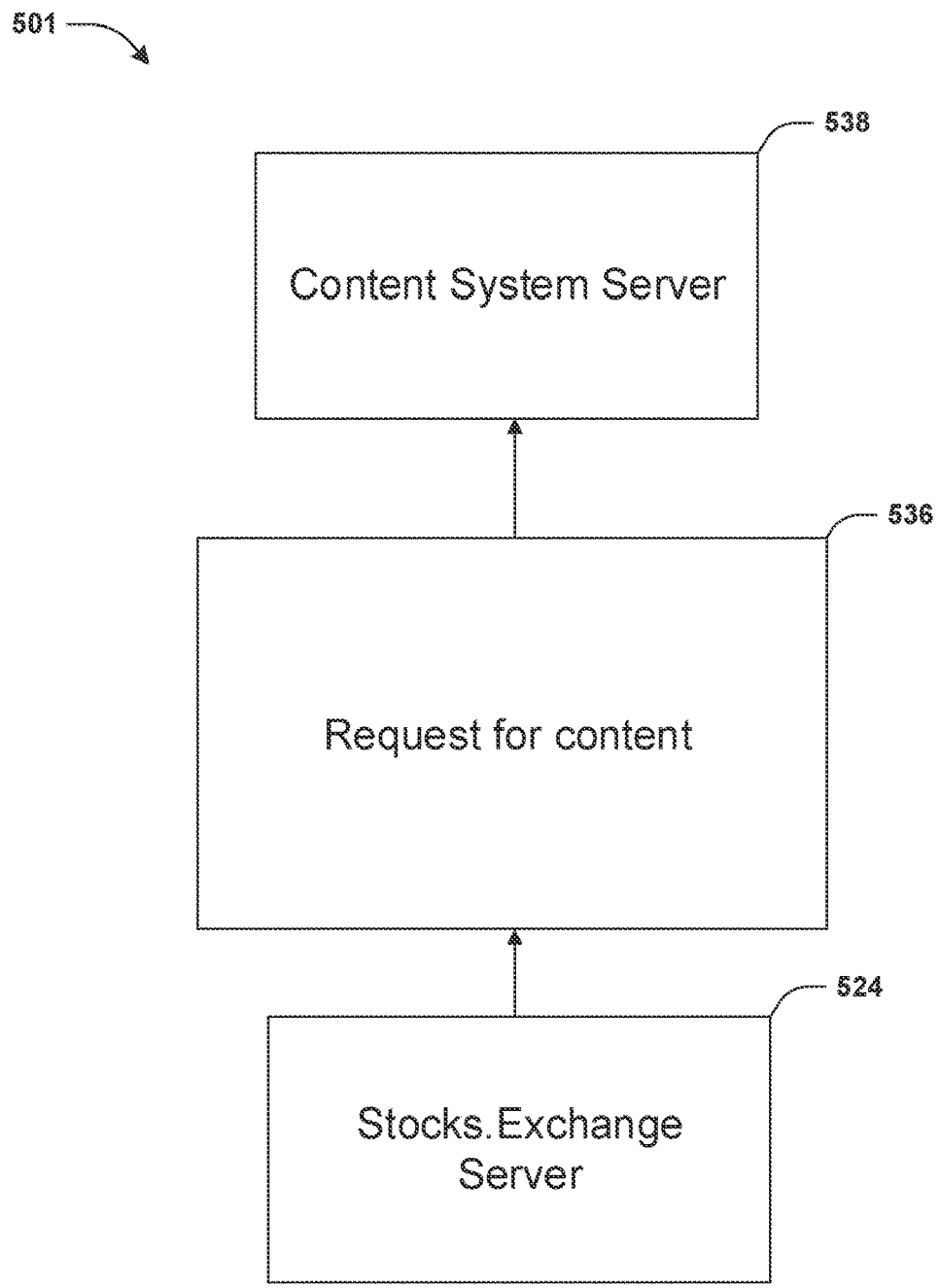
FIG. 5D is a component block diagram illustrating an example system for identifying coalition networks, where a first server transmits a first request for content to a second server associated with a content system.

FIG. 5D illustrates the first server 524 transmitting a first request for content 536 to a second server 538 associated with the content system. In some examples, the first request for content 536 may be transmitted (by the first server 524) responsive to receiving the request 522 to access the resource. Alternatively and/or additionally, the first request for content 536 may be transmitted (to the second server 538) by the first client device 500. In some examples, the first request for content 536 may be a request to be provided with a content item (e.g., an advertisement, an image, a link, a video, etc.) for presentation via the fourth web page 544.

In some examples, the first request for content 536 may comprise an indication of the first entity, such as at least one of a device identifier associated with the first client device 500, an IP address associated with the first client device 500, a carrier identifier indicative of carrier information associated with the first client device 500, a user identifier (e.g., at least one of a username, an email address, a user account identifier, etc.) associated with the first client device 500, a browser cookie, etc. Alternatively and/or additionally, the first request for content 536 may comprise an indication of the second entity (e.g., "stocks.exchange.com"), such as at least one of an internet resource identifier associated with the fourth web page 544, a domain associated with the fourth web page 544, a host identifier of a host device associated with the fourth web page 544, a publisher identifier associated with a publisher of the fourth web page 544, etc. Accordingly, the first entity and/or the second entity may be determined based upon the first request for content 536.

In some examples, responsive to receiving the first request for content 536, a bidding process may be performed to select a content item from a first plurality of content items participating in an auction (e.g., an auction for selection of a content item to present via the first client device 500). In some examples, the first plurality of content items (participating in the auction) may comprise a first content item 546 (illustrated in FIG. 5E).

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise a first bid value associated with the first content item 546.

In some examples, the first content item 546 may be selected from the first plurality of content items for presentation via the first client device 500 based upon the first plurality of bid values. For example, the first content item 546 may be selected from the first plurality of content items based upon a determination that the first bid value associated with the first content item 546 exceeds a threshold bid value. Alternatively and/or additionally, the first content item 546 may be selected from the first plurality of content items based upon a determination that the first bid value is greater than one or more other bid values of the first plurality of bid values. Alternatively and/or additionally, the first content item 546 may be selected from the first plurality of content items based upon a determination that the first bid value is a highest bid value of the first plurality of bid values.

Alternatively and/or additionally, a first plurality of content item scores associated with the first plurality of content items may be determined. For example, the first plurality of content items scores may be determined based upon the first plurality of bid values and/or a first plurality of click probabilities associated with the first plurality of content items. In some examples, the first content item 546 may be selected from the first plurality of content items for presentation via the first client device 500 based upon the first plurality of content item scores. For example, the first content item 546 may be selected from the first plurality of content items based upon a determination that a first content item score associated with the first content item 546 exceeds a threshold content item score. Alternatively and/or additionally, the first content item 546 may be selected from the first plurality of content items based upon a determination that the first content item score is greater than one or more other content item scores of the first plurality of content item scores. Alternatively and/or additionally, the first content item 546 may be selected from the first plurality of content items based upon a determination that the first content item score is a highest content item score of the first plurality of content item scores.

Figure 5E:
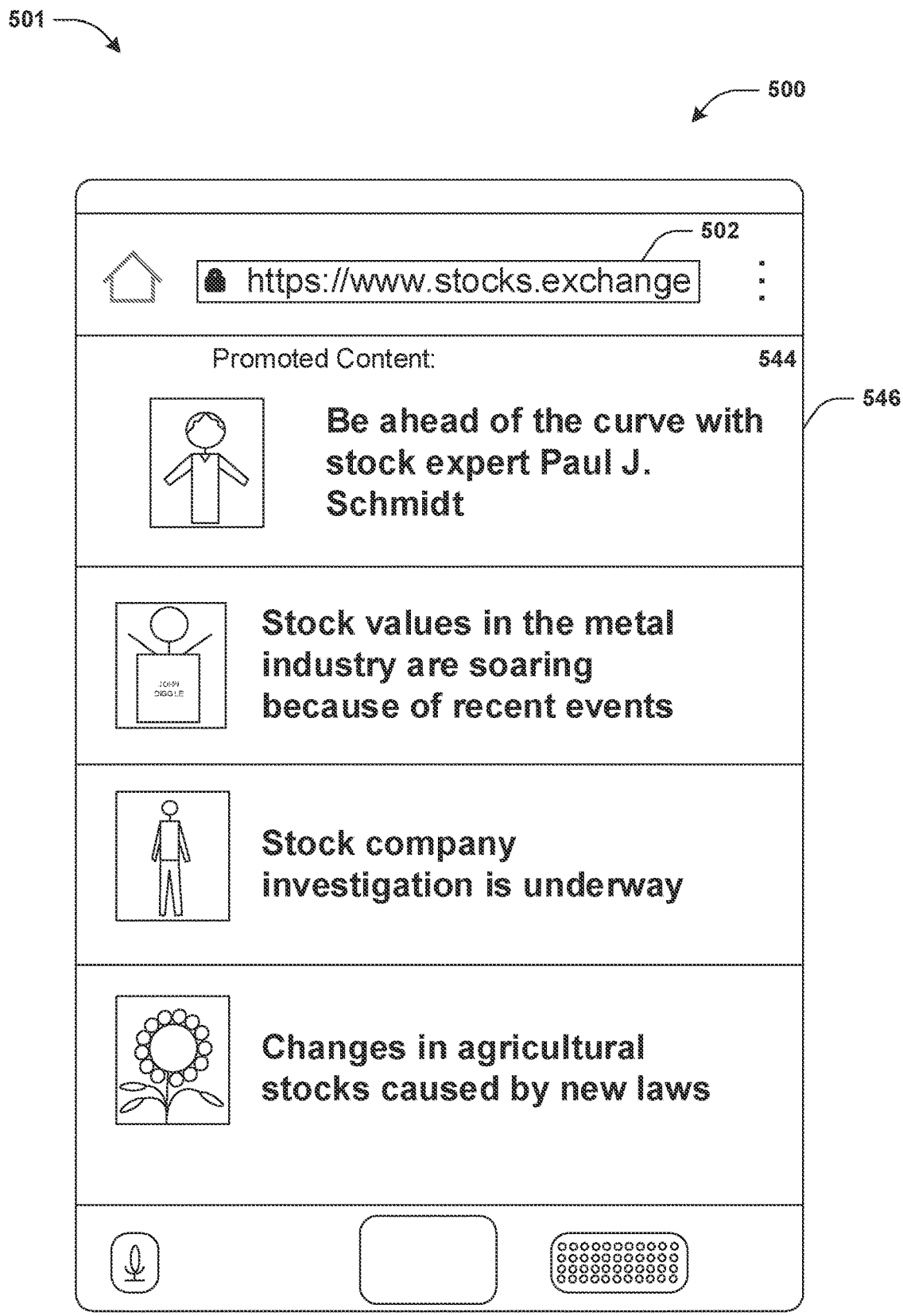
FIG. 5E is a component block diagram illustrating an example system for identifying coalition networks, where a first client device presents and/or accesses a fourth web page using a browser.

In some examples, responsive to selecting the first content item 546 for presentation via the first client device 500, the first content item 546 may be transmitted to the first client device 500 for presentation via the fourth web page 544. FIG. 5E illustrates the first client device 500 presenting and/or accessing the fourth web page 544 using the browser. For example, the content system may provide the first content item 546 to be presented via the fourth web page 544 while the fourth web page 544 is accessed by the first client device 500.

In an example where events of the first plurality of events comprise presentations of content, the first event of the first plurality of events may be detected by determining that the first content item 546 is presented via the first client device 500. Alternatively and/or additionally, the first event may be detected by receiving a signal indicative of the first content item 546 being presented via the first client device 500. For example, the first set of event information, indicative of the first event, may be stored responsive to determining that the first content item 546 is presented via the first client device 500 and/or responsive to receiving the signal.

In an example where events of the first plurality of events comprise presentations of threshold proportions of content items, the first event may be detected by determining that at least a threshold proportion of the first content item 546 is presented and/or displayed via the first client device 500. Alternatively and/or additionally, the first event may be detected by receiving a signal indicative of the threshold proportion of the first content item 546 being presented and/or displayed via the first client device 500. For example, the first set of event information, indicative of the first event, may be stored responsive to determining that the threshold proportion of the first content item 546 is presented via the first client device 500 and/or responsive to receiving the signal.

In an example where events of the first plurality of events comprise selections of content (e.g., advertisement clicks), the first event may be detected by detecting a selection of the first content item 546 via the first client device 500. Alternatively and/or additionally, the first event may be detected by receiving a signal indicative of the first content item 546 being selected via the first client device 500. For example, the first set of event information, indicative of the first event, may be stored responsive to detecting the selection of the first content item 546 and/or responsive to receiving the signal.

In an example where events of the first plurality of events correspond to conversion events, the first event may be detected by detecting a first conversion event associated with the first content item 546 and the first client device 500. Alternatively and/or additionally, the first event may be detected by receiving a signal indicative of the first conversion event. For example, the first set of event information, indicative of the first event, may be stored responsive to detecting the first conversion event and/or responsive to receiving the signal.

In some examples, the first conversion event may be associated with a third entity associated with the first content item 546. The third entity may correspond to a third entity type. The third entity type may correspond to advertising-side entities, such as at least one of advertisements, creatives, advertisers, companies, brands, organizations, etc. associated with content items presented by the content system. For example, the third entity may correspond to at least one of the first content item 546, a creative, an advertisement, an advertiser, a company, a brand, an organization, etc. The first content item 546 (and/or one or more other content items associated with a content campaign) may be used for promoting one or more products and/or one or more services.

In some examples, the first conversion event may correspond to at least one of a purchase of a product of one or more products associated with the third entity, a purchase of a service of one or more services associated with the third entity, subscribing to (and/or signing up for) a service associated with the third entity, contacting the third entity (e.g., contacting the third entity via one or more of email, phone, etc.), a selection of a content item associated with the third entity, an interaction with a content item associated with the third entity, accessing a web page associated with the third entity, adding a product and/or a service associated with the third entity to a shopping cart on an online shopping platform, completing a form (e.g., a survey form), creating and/or registering an account (e.g., a user account) for a platform associated with the third entity (e.g., creating a shopping user account for an online shopping platform), downloading an application (e.g., a mobile application) associated with the third entity onto the first client device 500 and/or installing the application on the first client device 500, opening and/or interacting with the application, utilizing one or more services associated with the third entity using the application, etc.

In some examples, the first set of event information of the first plurality of sets of event information may be indicative of the first content item 546 (e.g., the first set of event information may comprise a content item identifier associated with the first content item 546), a first time that the first event occurs, the first entity and/or the second entity. Alternatively and/or additionally, the first plurality of sets of event information may comprise indications of a third plurality of entities, comprising an indication of the third entity, corresponding to the third entity type (e.g., advertising-side entities). For example, the first set of event information may be indicative of the third entity associated with the first content item 546.

At 404, a first network profile associated with the first plurality of entities and/or the second plurality of entities may be generated based upon the first plurality of sets of event information. In some examples, the first network profile may be indicative of event metrics associated with entities of the first plurality of entities and/or the second plurality of entities, such as a rate at which events associated with a client-side entity and an internet resource-side entity occur, and/or a quantity of events associated with a client-side entity and an internet resource-side entity.

In some examples, the first network profile is indicative of one or more first sets of event metrics associated with the first entity and one or more first entities comprising the second entity. For example, the one or more first entities may correspond to one or more internet resource-side entities of the second plurality of entities.

In some examples, a first set of event metrics of the one or more first sets of event metrics may correspond to a measure of events associated with the first entity and the second entity. The events associated with the first entity and the second entity may comprise the first event. Alternatively and/or additionally, an event associated with the first entity and the second entity may be associated with a presentation of a content item (e.g., an advertisement) via the first client device 500 using an internet resource of the one or more first internet resources associated with the second entity. Alternatively and/or additionally, an event associated with the first entity and the second entity may be associated with a presentation of a threshold proportion of a content item (e.g., an advertisement) via the first client device 500 using an internet resource of the one or more first internet resources associated with the second entity. Alternatively and/or additionally, an event associated with the first entity and the second entity may be associated with a selection of a content item (e.g., an advertisement) via the first client device 500 using an internet resource of the one or more first internet resources associated with the second entity. Alternatively and/or additionally, an event associated with the first entity and the second entity may correspond to a conversion event associated with a content item (e.g., an advertisement) that is presented via the first client device 500 using an internet resource of the one or more first internet resources associated with the second entity.

The first set of event metrics may be indicative of a first event rate at which events associated with the first entity and the second entity occur, such as during the first period of time. In an example, the first event rate may correspond to a quantity of events associated with the first entity and the second entity per unit of time (e.g., per day, per week and/or per a different unit of time). In an example, the first event rate may correspond to five events per day (e.g., on average, five events associated with the first entity and the second entity may occur per day). Alternatively and/or additionally, the first set of event metrics may be indicative of a first quantity of events associated with the first entity and the second entity, such as during the first period of time. In an example, the first event rate may be determined based upon a duration of the first period of time and/or the first quantity of events associated with the first entity and the second entity.

In some examples, the one or more first entities associated with the one or more first sets of event metrics may comprise entities, of the second plurality of entities, with which the first entity performed at least one event of the first plurality of events. For example, the first plurality of sets of event information may be analyzed based upon the first entity to identify the one or more first entities with which the first entity performed at least one event of the first plurality of events.

Alternatively and/or additionally, the one or more first entities associated with the one or more first sets of event metrics may comprise entities, of the second plurality of entities, with which the first entity performed events, amounting to at least a threshold quantity of events, of the first plurality of events. For example, the first plurality of sets of event information may be analyzed based upon the first entity and the threshold quantity of events to identify the one or more first entities with which the first entity performed events, amounting to at least the threshold quantity events, of the first plurality of events.

In some examples, for each entity of the one or more first entities, a set of event metrics associated with the first entity and the entity may be determined (based upon the first plurality of sets of event information) and included in the first network profile.

In some examples, the first network profile may be indicative of a plurality of weights associated with relationships between entities of the first plurality of entities and/or the second plurality of entities (and/or the third plurality of entities). For example, the plurality of weights may comprise one or more first weights associated with one or more relationships between the first entity and the one or more first entities (with which the first entity performed at least one event of the first plurality of events and/or with which the first entity performed events, amounting to at least the threshold quantity of events, of the first plurality of events). The one or more first weights may be determined based upon the one or more first sets of event metrics associated with the first entity and the one or more first entities. In an example, the one or more first weights may comprise a first weight associated with a relationship between the first entity and the second entity. The first weight may be determined based upon the first set of event metrics associated with the first entity and the second entity. In an example, the first weight may be determined based upon the first event rate and/or the first quantity of events associated with the first entity and the second entity. In an example, one or more operations (e.g., mathematical operations) may be performed using the first event rate, the first quantity of events and/or one or more other values to determine the first weight associated with the relationship between the first entity and the second entity. In some examples, a higher value of the first event rate and/or a higher value of the first quantity of events may correspond to a higher weight of the first weight.

Figure 5F:
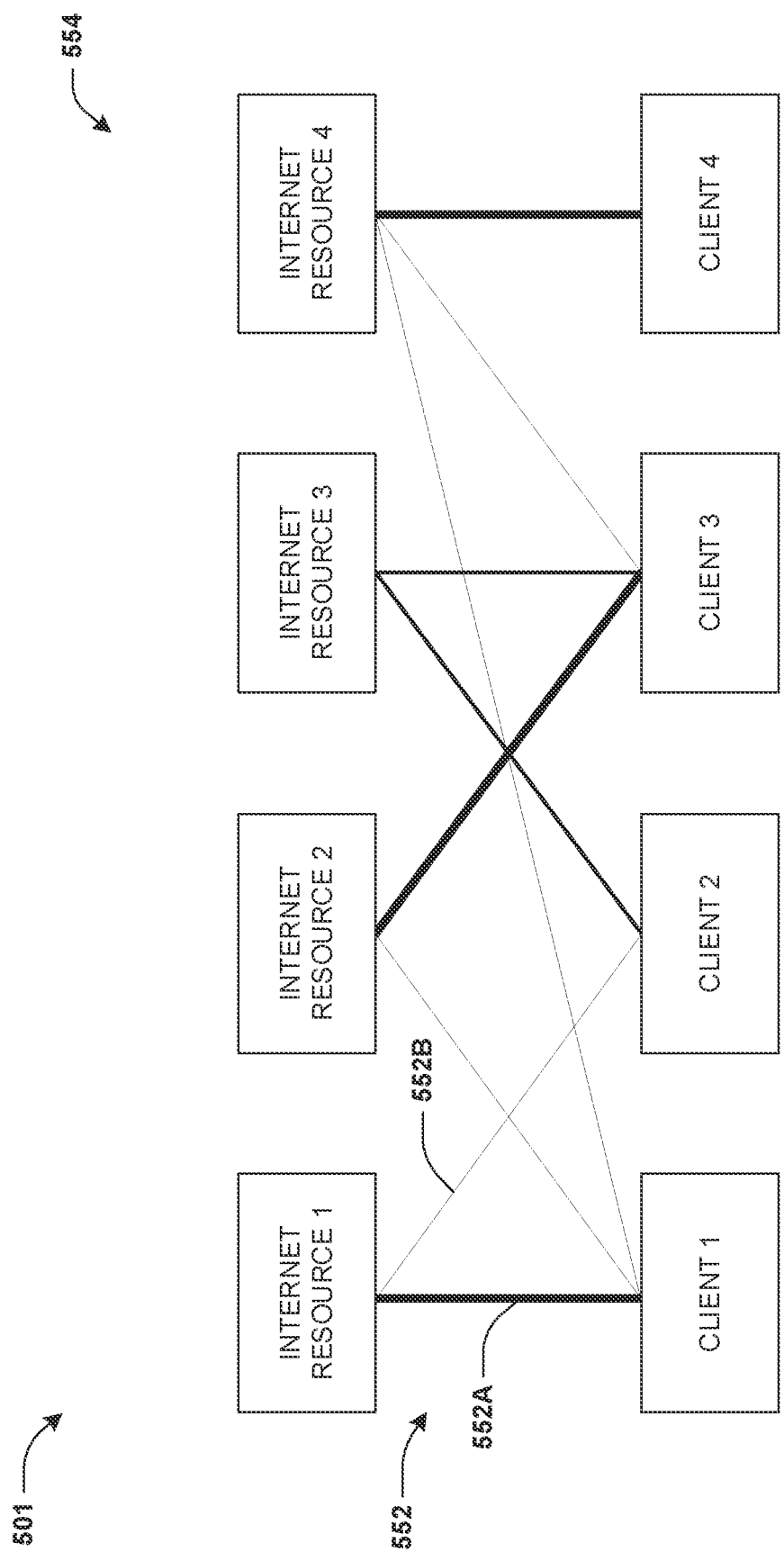
FIG. 5F is a component block diagram illustrating a representation of a first network profile generated by an example system for identifying coalition networks.

FIG. 5F illustrates a representation 554 of the first network profile. In some examples, the representation 554 may correspond to a graph, such as a bipartite graph. The representation 554 may comprise relationship lines 552. A relationship line of the relationship lines 552 may be between a client-side entity (e.g., labeled "CLIENT 1", CLIENT 2", etc. in FIG. 5F) and an internet resource-side entity (e.g., labeled "INTERNET RESOURCE 1", INTERNET RESOURCE 2", etc. in FIG. 5F). A relationship line of the relationship lines 552 between a client-side entity and an internet resource-side entity may be indicative of at least one event, of the first plurality of events, having occurred in association with the client-side entity and the internet resource-side entity. Alternatively and/or additionally, a relationship line of the relationship lines 552 between a client-side entity and an internet resource-side entity may be indicative of events (of the first plurality of events), amounting to at least the threshold quantity of events, having occurred in association with the client-side entity and the internet resource-side entity.

In some examples, a relationship line of the relationship lines 552 between a client-side entity and an internet resource-side entity may have a thickness that reflects a weight of a relationship between the client-side entity and the internet resource-side entity, a quantity of events having occurred in association with the client-side entity and the internet resource-side entity and/or an event rate at which events associated with the client-side entity and the internet resource-side entity occur. In an example, a first relationship line 552A of the relationship lines 552 may be between an internet resource-side entity "INTERNET RESOURCE 1" and a client-side entity "CLIENT 1". A second relationship line 552B of the relationship lines 552 may be between the internet resource-side entity "INTERNET RESOURCE 1" and a client side entity "CLIENT 2". A thickness of the first relationship line 552A may be greater than a thickness of the second relationship line 552B. Accordingly, a weight (of the plurality of weights) of a relationship between the internet resource-side entity "INTERNET RESOURCE 1" and the client-side entity "CLIENT 1" may be higher than a weight (of the plurality of weights) of a relationship between the internet resource-side entity "INTERNET RESOURCE 1" and the client-side entity "CLIENT 2". Alternatively and/or additionally, a quantity of events having occurred in association with the internet resource-side entity "INTERNET RESOURCE 1" and the client-side entity "CLIENT 1" may be greater than a quantity of events having occurred in association with the internet resource-side entity "INTERNET RESOURCE 1" and the client-side entity "CLIENT 2". Alternatively and/or additionally, an event rate at which events associated with the internet resource-side entity "INTERNET RESOURCE 1" and the client-side entity "CLIENT 1" occur may be greater than an event rate at which events associated with the internet resource-side entity "INTERNET RESOURCE 1" and the client-side entity "CLIENT 2" occur.

In some examples, the first network profile may be indicative of event metrics associated with entities of the third plurality of entities, such as a rate at which events associated with an advertising-side entity and a client-side entity occur, a quantity of events associated with an advertising-side entity and a client-side entity, a rate at which events associated with an advertising-side entity and an internet resource-side entity occur and/or a quantity of events associated with an advertising-side entity and an internet resource-side entity.

In some examples, the first network profile is indicative of one or more second sets of event metrics associated with the first entity and one or more second entities comprising the third entity. For example, the one or more second entities may correspond to one or more advertising-side entities of the third plurality of entities.

In some examples, a second set of event metrics of the one or more second sets of event metrics may correspond to a measure of events associated with the first entity and the third entity. The events associated with the first entity and the third entity may comprise the first event. Alternatively and/or additionally, an event associated with the first entity and the third entity may be associated with a presentation of a content item (e.g., an advertisement), associated with the third entity, via the first client device 500 (e.g., the content item may correspond to the first content item 546 and/or a different content item associated with the third entity). Alternatively and/or additionally, an event associated with the first entity and the third entity may be associated with a presentation of a threshold proportion of a content item (e.g., an advertisement), associated with the third entity, via the first client device 500. Alternatively and/or additionally, an event associated with the first entity and the third entity may be associated with a selection of a content item (e.g., an advertisement), associated with the third entity, via the first client device 500. Alternatively and/or additionally, an event associated with the first entity and the second entity may correspond to a conversion event, associated with the third entity, performed by the first client device 500.

The second set of event metrics may be indicative of a second event rate at which events associated with the first entity and the third entity occur, such as during the first period of time. In an example, the second event rate may correspond to a quantity of events associated with the first entity and the third entity per unit of time (e.g., per day, per week and/or per a different unit of time). Alternatively and/or additionally, the second set of event metrics may be indicative of a second quantity of events associated with the first entity and the third entity, such as during the first period of time.

In some examples, the first network profile is indicative of one or more third sets of event metrics associated with the second entity and one or more third entities comprising the third entity. For example, the one or more third entities may correspond to one or more advertising-side entities of the third plurality of entities.

In some examples, a third set of event metrics of the one or more third sets of event metrics may correspond to a measure of events associated with the second entity and the third entity. The events associated with the second entity and the third entity may comprise the first event. Alternatively and/or additionally, an event associated with the second entity and the third entity may be associated with a presentation of a content item (e.g., an advertisement), associated with the third entity, via an internet resource associated with the second entity. Alternatively and/or additionally, an event associated with the second entity and the third entity may be associated with a presentation of a threshold proportion of a content item (e.g., an advertisement), associated with the third entity, via an internet resource associated with the second entity. Alternatively and/or additionally, an event associated with the second entity and the third entity may be associated with a selection of a content item (e.g., an advertisement), associated with the third entity, via an internet resource associated with the second entity. Alternatively and/or additionally, an event associated with the second entity and the third entity may correspond to a conversion event associated with presentation of a content item (e.g., an advertisement), associated with the third entity, via an internet resource associated with the second entity.

The third set of event metrics may be indicative of a third event rate at which events associated with the second entity and the third entity occur, such as during the first period of time. In an example, the third event rate may correspond to a quantity of events associated with the second entity and the third entity per unit of time (e.g., per day, per week and/or per a different unit of time). Alternatively and/or additionally, the third set of event metrics may be indicative of a third quantity of events associated with the second entity and the third entity, such as during the first period of time.

At 406, a first arrangement of a plurality of particles in a space may be generated. The space may correspond to at least one of a box, a simulation space, a simulation box, an embedding space, etc. In some examples, a first particle of the plurality of particles may correspond to the first entity and/or a second particle of the plurality of particles may correspond to the second entity. For example, the plurality of particles may comprise a first plurality of particles corresponding to entities of the first plurality of entities (corresponding to the first entity type) and/or a second plurality of particles corresponding to entities of the second plurality of entities (corresponding to the second entity type). In some examples, the plurality of particles may comprise a third plurality of particles corresponding to entities of the third plurality of entities (corresponding to the third entity type).

In some examples, the space may be a d-dimensional space and/or the first arrangement may correspond to a d-dimensional layout of particles. In an example, d may be equal to 2 (e.g., the space may be a 2-dimensional space and/or the first arrangement may correspond to a 2-dimensional layout of particles). Alternatively and/or additionally, d may be greater than 2. In some examples, the first arrangement of the plurality of particles may be generated using one or more placement techniques. Positions of the plurality of particles in the first arrangement may correspond to initial positions of the plurality of particles. For example, the one or more placement techniques may correspond to random placement of particles (where the first arrangement is a random arrangement of particles and/or where positions of particles in the first arrangement are randomly determined), or other type of placement of particles. In an example, a random position algorithm associated with random placement of particles may be used to generate the first arrangement of the plurality of particles (and/or initial positions of the plurality of particles may be determined using the random position algorithm). Alternatively and/or additionally, a deterministic algorithm may be used to generate the first arrangement of the plurality of particles (and/or initial positions of the plurality of particles may be determined using the deterministic algorithm). In some examples, the first arrangement may be generated based upon a minimum distance and/or a maximum distance. For example, the first arrangement may be generated such that distances between particles of the plurality of particles are not larger than the maximum distance and/or are not smaller than the minimum distance.

At 408, a plurality of charges associated with the plurality of particles may be determined based upon the first network profile. In some examples, charges of the plurality of charges may be assigned to particles of the plurality of particles. The plurality of charges may comprise a plurality of attractive charges and/or a plurality of repulsive charges. In some examples, a repulsive charge of the plurality of repulsive charges may be associated with a repulsive force between a particle of the plurality of particles and particles, different than the particle, of the plurality of particles. In some examples, the repulsive charge and/or the repulsive force may be related to and/or based upon repulsion of magnetism and/or electromagnetism and/or electrostatic force of repulsion.

Alternatively and/or additionally, an attractive charge of the plurality of attractive charges may be associated with an attractive force between a pair of particles of the plurality of particles corresponding to a pair of entities. In some examples, the pair of entities may comprise an entity of the first plurality of entities and an entity of the second plurality of entities. Alternatively and/or additionally, the pair of entities may comprise an entity of the first plurality of entities and an entity of the third plurality of entities. Alternatively and/or additionally, the pair of entities may comprise an entity of the second plurality of entities and an entity of the third plurality of entities.

Alternatively and/or additionally, the pair of entities may be neighboring entities in the first network profile. A pair of neighboring entities may correspond to a pair of entities that, together, performed and/or are associated with performance of one or more events of the first plurality of events (such as a pair of entities with a relationship line 552 between them, such as shown in FIG. 5F). Alternatively and/or additionally, a pair of neighboring entities may comprise two entities that, together, performed and/or are associated with performance of events, amounting to at least the threshold quantity of events, of the first plurality of events. An example of a pair of neighboring entities is the first entity and the second entity that together performed one or more events (such as the first event), of the first plurality of events, during the first period of time. In some examples, an attractive charge of the plurality of attractive charges may be assigned to a pair of particles corresponding to a pair of neighboring entities (and/or each attractive charge of the plurality of attractive charges may be assigned to a pair of particles corresponding to a pair of neighboring entities). In some examples, attractive charges of the plurality of attractive charges may be assigned to merely pairs of neighboring entities in the first network profile. Alternatively and/or additionally, attractive charges of the plurality of attractive charges may be assigned to pairs of neighboring entities and pairs of non-neighboring entities in the first network profile. A pair of non-neighboring entities may comprise two entities that, together, have not performed and/or are not associated with performance of at least one event of the first plurality of events. Alternatively and/or additionally, a pair of non-neighboring entities may comprise two entities that, together, have not performed and/or are not associated with performance of events, amounting to at least the threshold quantity of events, of the first plurality of events. In an example, a pair of non-neighboring entities may comprise a pair of entities that do not have a relationship line 552 between them, such as shown in FIG. 5F. In some examples, attractive charges, of the plurality of attractive charges, that are assigned to pairs of non-neighboring entities may be equal to 0 (or other value). In some examples, an attractive charge of the plurality of attractive charges and/or an attractive force associated with the attractive charge may be related to and/or based upon nuclear physics and/or forces that bind atoms, molecules and/or subatomic particles.

In some examples, the plurality of repulsive charges may comprise a first repulsive charge assigned to the first particle (corresponding to the first entity). In some examples, the first repulsive charge may be associated with a repulsive force between the first particle and particles, of the plurality of particles, different than the first particle. In an example, the first repulsive charge may be determined based upon the one or more first sets of event metrics associated with the first entity and the one or more first entities (with which the first entity performed at least one event of the first plurality of events and/or with which the first entity performed events, amounting to at least the threshold quantity of events, of the first plurality of events). In some examples, the first repulsive charge may be determined based upon a measure of events associated with the first entity and the one or more first entities, such as at least one of an event rate at which events associated with the first entity and the one or more first entities occur (such as during the first period of time), a quantity of events associated with the first entity and the one or more first entities (such as during the first period of time), etc. Alternatively and/or additionally, the first repulsive charge may be determined based upon a total quantity of events, of the first plurality of events, that are associated with the first entity. Alternatively and/or additionally, the first repulsive charge may be determined based upon the one or more first weights associated with the one or more relationships between the first entity and the one or more first entities. In an example, one or more operations (e.g., mathematical operations) may be performed using the measure of events, the total quantity of events, the one or more first weights and/or one or more other values to determine the first repulsive charge assigned to the first particle.

In some examples, the plurality of attractive charges may comprise one or more first attractive charges assigned to the first particle (corresponding to the first entity). The one or more first attractive charges may be associated with the first particle and one or more first particles corresponding to the one or more first entities (with which the first entity performed at least one event of the first plurality of events and/or with which the first entity performed events, amounting to at least the threshold quantity of events, of the first plurality of events). In some examples, the one or more first attractive charges may be determined based upon the one or more first sets of event metrics associated with the first entity and the one or more first entities. Alternatively and/or additionally, the one or more first attractive charges may be determined based upon the one or more first weights associated with the one or more relationships between the first entity and one or more first entities.

In an example, the one or more first attractive charges may comprise a first attractive charge assigned to a pair of particles comprising the first particle (corresponding to the first entity) and the second particle (corresponding to the second entity). For example, the first attractive charge may be determined and/or assigned to the first particle and the second particle based upon the first entity and the second entity being neighboring entities. In some examples, the first attractive charge may be associated with an attractive force between the first particle and the second particle. In some examples, the first attractive charge may be determined based upon the first set of event metrics associated with the first entity and the second entity. For example, the first attractive charge may be determined based upon the first event rate and/or the first quantity of events associated with the first entity and the second entity. Alternatively and/or additionally, the first attractive charge may be determined based upon the first weight associated with the relationship between the first entity and the second entity. In an example, one or more operations (e.g., mathematical operations) may be performed using the first event rate, the first quantity of events, the first weight and/or one or more other values to determine the first attractive charge assigned to the first particle and the second particle. In some examples, a higher value of the first event rate, a higher value of the first quantity of events and/or a higher weight of the first weight may correspond to a greater charge of the first attractive charge (and/or a greater force of an attractive force, associated with the first attractive charge, between the first particle and the second particle). For example, a greater thickness of a relationship line between the first entity and the second entity (as indicated by the first network profile and/or the representation 554 of the first network profile, for example) may correspond to a greater charge of the first attractive charge (and/or a greater force of an attractive force, associated with the first attractive charge, between the first particle and the second particle).

Figure 5G:
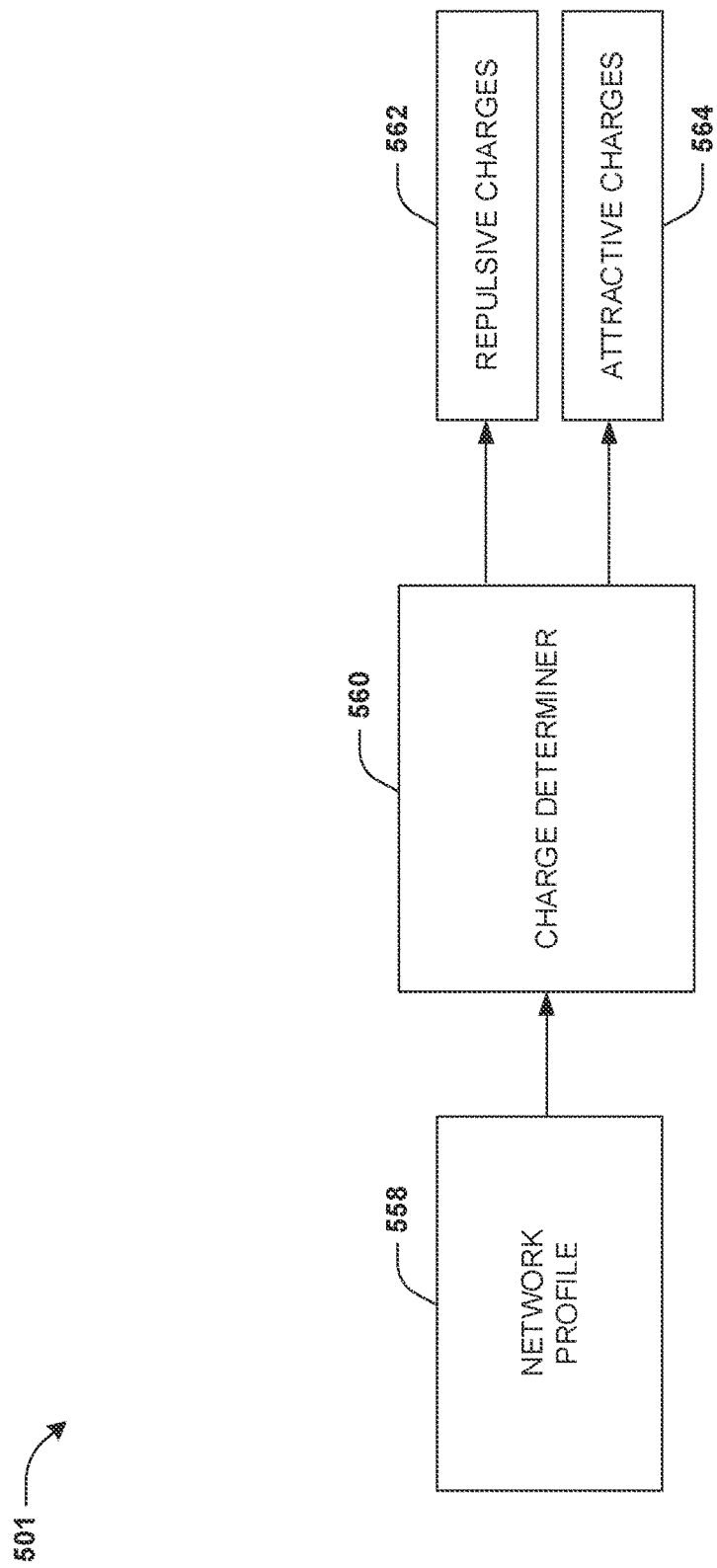
FIG. 5G is a component block diagram illustrating an example system for identifying coalition networks, where a plurality of repulsive charges and a plurality of attractive charges are determined.

FIG. 5G illustrates an exemplary scenario in which the plurality of repulsive charges (shown with reference number 562) and the plurality of attractive charges (shown with reference number 564) are generated. For example, the first network profile (shown with reference number 558) may be input to a charge determiner 560. The charge determiner 560 may determine and/or output the plurality of repulsive charges 562 and/or the plurality of attractive charges 564 based upon the first network profile 558.

At 410, the plurality of particles may be rearranged to generate a second arrangement of the plurality of particles in the space. In some examples, the plurality of particles may be rearranged based upon the plurality of charges, positions of the plurality of particles in the first arrangement and/or one or more parameters, such as comprising at least one of a resistance, an initial velocity of particles of the plurality of particles (e.g., a velocity of particles when the simulation is started, such as 0 or a different velocity), etc.

In some examples, a simulation (e.g., a force simulation) may be performed to rearrange the plurality of particles from the first arrangement to the second arrangement. In some examples, the simulation may be performed based upon the plurality of charges, the positions of the plurality of particles in the first arrangement, and/or the one or more parameters. The simulation may simulate rearrangement and/or motion of particles of the plurality of particles in accordance with at least one of the plurality of charges, positions of the plurality of plurality of particles in the first arrangement, the resistance, the initial velocity of particles of the plurality of particles, etc.

Forces applied to particles as a result of at least one of the plurality of charges, the resistance, etc. may be taken into account in the simulation. In some examples, the resistance may correspond to friction and/or drag in the space. For example, the resistance may be taken into account such that particles of the plurality of particles reach a steady state in the simulation (e.g., a state in which particles of the plurality of particles are not moving in the simulation and/or a state in which a velocity and/or displacement associated with motion of the particles in the simulation is less than a threshold velocity and/or threshold displacement). In some examples, the resistance may correspond to a decay, such as a decay in velocity and/or acceleration of particles of the plurality of particles in the simulation.

Alternatively and/or additionally, repulsive forces associated with repulsive charges of particles of the plurality of particles may be taken into account in the simulation. For example, a first repulsive force may be applied to the first particle based upon the first repulsive charge assigned to the first particle and/or a second repulsive charge assigned to a third particle of the plurality of particles (e.g., the third particle may correspond to a fourth entity of the first plurality of entities, the second plurality of entities, or the third plurality of entities). The first repulsive force may be determined based upon a distance (in the space), such as a radial distance, between the first particle and the third particle, a first power value used for determining repulsive forces based upon repulsive charges of particles, a first repulsive strength coefficient used for determining repulsive forces based upon repulsive charges of particles, the first repulsive charge assigned to the first particle and/or the second repulsive charge assigned to the third particle. In an example, the first repulsive force may be equal to and/or based upon $$\frac{E_{rep} \times q_1 \times q_2}{r_{12}^{P_{rep}}},$$

where $E_{rep}$ corresponds to the first repulsive strength coefficient, $q_1$ corresponds to the first repulsive charge assigned to the first particle, $q_2$ corresponds to the second repulsive charge assigned to the third particle, $r_{12}$ corresponds to the distance between the first particle and the third particle, and/or $P_{rep}$ corresponds to the first power value (to which the distance is raised, for example). In some examples, $P_{rep}$ may be equal to 2 (or other value). In some examples, a direction of the first repulsive force (e.g., a direction in which the first repulsive force is applied to the first particle) may be determined based upon a position of the first particle and a position of the third particle in the space (e.g., the direction of the first repulsive force may be based upon a direction of separation between the first particle and the third particle). In some examples, multiple repulsive forces, comprising the first repulsive force, that are applied to the first particle in the simulation may be determined. Repulsive forces of the multiple repulsive forces, other than the first repulsive force, may be determined using one or more of the techniques provided herein for determining the first repulsive force. Directions of the repulsive forces may be determined using one or more of the techniques provided herein for determining the direction of the first repulsive force. A first net repulsive force and/or a direction of the first net repulsive force (e.g., a direction in which the first net repulsive force is applied to the first particle) may be determined based upon the multiple repulsive forces and/or directions of the multiple repulsive forces.

In some examples, repulsive forces and/or net repulsive forces applied to particles of the plurality of particles, other than the first particle, may be determined using one or more of the techniques provided herein for determining the first repulsive force applied to the first particle and/or the first net repulsive force applied to the first particle. The repulsive forces and/or the net repulsive forces may be determined using the first repulsive strength coefficient $E_{rep}$ and/or the first power value $P_{rep}$. In an example, for two particles i and j of the plurality of particles with charges $q_i$ and $q_j$ respectively, a repulsive force, applied to the particle i and the particle j as a result of the charges $q_i$ and $q_j$, may be equal to and/or based upon $$\frac{E_{rep} \times q_i \times q_j}{r_{ij}^{P_{rep}}},$$

where $E_{rep}$ corresponds to the first repulsive strength coefficient, $q_i$ corresponds to the a repulsive charge assigned to the particle i, $q_j$ corresponds to a repulsive charge assigned to the particle j, $r_{ij}$ corresponds to a distance, such as a radial distance, between the particle i and the particle j, and/or $P_{rep}$ corresponds to the first power value (to which the distance is raised, for example). In some examples, directions of repulsive forces and/or directions of net repulsive forces applied to particles of the plurality of particles, other than the first particle, may be determined using one or more of the techniques provided herein for determining the direction of the first repulsive force applied to the first particle and/or the direction of the first net repulsive force applied to the first particle.

In some examples, attractive forces associated with attractive charges of pairs of particles (e.g., pairs of neighboring particles) of the plurality of particles may be taken into account in the simulation. For example, a first attractive force may be applied to the first particle based upon the first attractive charge assigned to the first particle and the second particle. The first attractive force may be determined based upon a distance (in the space), such as a radial distance, between the first particle and the second particle, a second power value used for determining attractive forces based upon attractive charges of particles, a first attractive strength coefficient used for determining attractive forces based upon attractive charges of particles and/or the first attractive charge. In an example, the first attractive force may be equal to and/or based upon $E_{att} \times Q_{12} \times r_{12}^{P_{att}}$, where $E_{att}$ corresponds to the first attractive strength coefficient, $Q_{12}$ corresponds to the first attractive charge assigned to the first particle and the second particle, $r_{12}$ corresponds to the distance between the first particle and the second particle, and/or $P_{att}$ corresponds to the second power value (to which the distance is raised, for example). In some examples, $P_{att}$ att may be equal to 1 (or other value). In some examples, a direction of the first attractive force (e.g., a direction in which the first attractive force is applied to the first particle) may be determined based upon a position of the first particle and a position of the second particle in the space (e.g., the direction of the first attractive force may be based upon a direction of separation between the first particle and the second particle). In some examples, one or more attractive forces, comprising the first attractive force, that are applied to the first particle in the simulation may be determined. An attractive force of the one or more attractive forces (and/or each attractive force of the one or more attractive forces) may be determined based upon an attractive charge, of the one or more first attractive charges assigned to the first entity and the one or more first particles associated with the one or more first entities. In an example in which the one or more attractive forces comprises multiple attractive forces, attractive forces of the multiple attractive forces, other than the first attractive force, may be determined using one or more of the techniques provided herein for determining the first attractive force. Directions of the attractive forces may be determined using one or more of the techniques provided herein for determining the direction of the first attractive force. A first net attractive force and/or a direction of the first net attractive force (e.g., a direction in which the first net attractive force is applied to the first particle) may be determined based upon the one or more attractive forces and/or directions of the one or more attractive forces.

In some examples, attractive forces and/or net attractive forces applied to particles of the plurality of particles, other than the first particle, may be determined using one or more of the techniques provided herein for determining the first attractive force applied to the first particle and/or the first net attractive force applied to the first particle. The attractive forces and/or the net attractive forces may be determined using the first attractive strength coefficient $E_{att}$ and/or the second power value $P_{rep}$. In an example, for two particles i and j of the plurality of particles with an attractive charge $Q_{ij}$, an attractive force, applied to the particle i and the particle j as a result of the attractive charge $Q_{ij}$, may be equal to and/or based upon $E_{att} \times Q_{ij} \times r_{ij}^{P_{att}}$, where $E_{att}$ corresponds to the first attractive strength coefficient, $Q_{ij}$ corresponds to the attractive charge assigned to the particles i and j, $r_{ij}$ corresponds to a distance, such as a radial distance, between the particle i and the particle j, and/or $P_{att}$ corresponds to the second power value (to which the distance is raised, for example). In some examples, directions of attractive forces and/or directions of net attractive forces applied to particles of the plurality of particles, other than the first particle, may be determined using one or more of the techniques provided herein for determining the direction of the first attractive force applied to the first particle and/or the direction of the first net attractive force applied to the first particle.

In some examples, a first net force applied to the first particle in the simulation may be determined based upon the first net repulsive force (and/or the multiple repulsive forces applied to the first particle), the first net attractive force (and/or the one or more attractive forces applied to the first particle), the resistance and/or one or more other forces. Alternatively and/or additionally, a direction of the first net force applied to the first particle in the simulation may be determined based upon a direction of the first net repulsive force (and/or directions of the multiple repulsive forces applied to the first particle), a direction of the first net attractive force (and/or one or more directions of the one or more attractive forces applied to the first particle), a direction of the resistance and/or one or more directions of one or more other forces.

In some examples, displacement and/or motion of the first particle in the simulation may be based upon at least one of the first net force, a first velocity of the first particle, a first acceleration of the first particle, a first direction of motion of the first particle, etc. The first net force, the first velocity, the first acceleration of the first particle and/or the first direction of motion may change throughout the simulation, such as due to changing positions of the first particle and other particles of the plurality of particles. In some examples, the first net force, the first velocity, the first acceleration and/or the first direction of motion may be determined and/or updated multiple times (e.g., periodically) during the simulation.

In some examples, the simulation comprises simulation iterations. Information may be determined and/or updated for a simulation iteration. The information may comprise one or more values and/or parameters, such as at least one of net forces applied to particles of the plurality of particles, velocities of particles of the plurality of particles, accelerations of the plurality of particles, directions of motion of particles of the plurality of particles, positions of particles of the plurality of particles, etc. In an example, displacement and/or motion of the first particle in the simulation iteration may correspond to displacement and/or motion of the first particle over a duration of time based upon the information determined for the simulation iteration (such as based upon at least one of the first net force applied to the first particle, the first velocity of the first particle, the first acceleration of the first particle, the first direction of motion of the first particle, a position of the first particle, etc.). In an example in which velocity decay is applied to simulate the resistance in the space, the first velocity of the first particle determined for the simulation iteration may be determined based upon a decay value. For example, the first velocity may be determined based upon the decay value and/or a velocity of the first particle of a previous simulation iteration (e.g., the first velocity may be equal to and/or based upon $V_{pre} \times (1-$ decay), where $V_{pre}$ corresponds to the velocity of the previous simulation iteration, such as a previous simulation iteration directly preceding the simulation iteration, and/or decay corresponds to the decay value).

In some examples, the simulation may be stopped in response to particles of the plurality of particles reaching a steady state in the simulation (e.g., a state in which particles of the plurality of particles are not moving in the simulation and/or a state in which a velocity and/or displacement associated with motion of the particles in the simulation is less than a threshold velocity and/or threshold displacement). Alternatively and/or additionally, the simulation may be stopped in response to performing simulation iterations of the simulation amounting to a threshold quantity of simulation iterations (e.g., a maximum quantity of simulation iterations). In some examples, the second arrangement of the plurality of particles may correspond to an arrangement of the plurality of particles when (or prior to) the simulation is stopped.

In some examples, the space of the simulation (in which particles are arranged in the first arrangement and/or rearranged into the second arrangement) may be an infinite space without boundaries. For example, positions of particles of the plurality of particles may not be limited by boundaries of the space. Alternatively and/or additionally, the space of the simulation may be a finite space (e.g., a finite box) with boundaries. For example, positions of particles of the plurality of particles may be limited by the boundaries of the space.

In some examples, one or more simulation parameters of the simulation may be configured based upon one or more simulation settings. For example, the one or more simulation settings may be received via a simulation settings interface (displayed via a client device, for example). In some examples, the one or more simulation parameters may comprise at least one of the initial velocity of particles of the plurality of particles, the resistance, the decay (e.g., the velocity decay), a size of the space (such as in an example in which the space is a finite space with boundaries), a number of dimensions of the space (e.g., d), the first repulsive strength coefficient, the first attractive strength coefficient, the first power value, the second power value, etc.

At 412, one or more first clusters of particles in the second arrangement of the plurality of particles in the space may be identified. In some examples, a cluster of the one or more first clusters of particles (and/or each cluster of the one or more first clusters of particles) corresponds to a set of particles of the plurality of particles. For example, a first cluster of the one or more first clusters of particles may correspond to a first set of particles of the plurality of particles.

In some examples, the first set of particles may be identified as the first cluster based upon a determination that particles of the first set of particles are within a threshold distance (e.g., a threshold radial distance) to each other. Alternatively and/or additionally, the first set of particles may be identified as the first cluster based upon a determination that a particle density of the first set of particles exceeds a threshold density. For example, one or more operations (e.g., mathematical operations) may be performed using positions of particles of the first set of particles to determine a density of the first set of particles. The density may be compared with the threshold density to determine whether the density is less than the threshold density.

Alternatively and/or additionally, the one or more first clusters of particles may be identified using one or more clustering techniques, such as one or more density-based clustering techniques (e.g., Density-Based Spatial Clustering of Applications with Noise (DBSCAN) and/or Hierarchical Density-Based Spatial Clustering of Applications with Noise (HDBSCAN)), spectral clustering techniques, one or more k-means clustering techniques and/or one or more other clustering techniques. Positions of the plurality of particles in the second arrangement may be analyzed using the one or more clustering techniques to identify the one or more first clusters of particles.

At 414, a first coalition network associated with fraudulent activity may be identified based upon a first cluster of particles of the one or more first clusters of particles. In some examples, the first coalition network may comprise a plurality of entities corresponding to particles of the first cluster of particles. The plurality of entities may be identified and/or recognized as being a network of entities used for performing fraudulent activity. In some examples, the first coalition network may correspond to a network of entities, corresponding to particles of the first cluster of particles, used to perform fraudulent activity, such as advertising fraud. In an example, the plurality of entities of the first coalition network may comprise a first set of entities of the first plurality of entities (corresponding to the first entity type) and/or a second set of entities of the second plurality of entities (corresponding to the second entity type). In an example in which the plurality of particles of the second arrangement comprise the third plurality of particles corresponding to entities of the third plurality of entities (corresponding to the third entity type), the plurality of entities of the first coalition network may comprise a third set of entities of the third plurality of entities. In some examples, the plurality of entities of the first coalition network may be identified based upon a determination that the first cluster of particles comprises particles corresponding to the plurality of entities.

In some examples, the first coalition network may be identified based upon a determination that one or more first conditions, associated with the first cluster of particles and/or the plurality of entities of the first coalition network, are met. In some examples, the one or more first conditions may comprise a first condition associated with a quantity of particles of the first cluster of particles. In some examples, the first condition may be met if the quantity of particles of the first cluster of particles exceeds a first threshold quantity of particles. Alternatively and/or additionally, the first condition may be met if the quantity of particles of the first cluster of particles is less than a second threshold quantity of particles. Alternatively and/or additionally, the first condition may be met if, among the one or more first clusters of particles identified in the second arrangement of particles, the first cluster of particles does not have the highest quantity of particles (e.g., at least one cluster of particles of the one or more first clusters of particles comprises particles amounting to a quantity of particles exceeding the quantity of particles of the first cluster of particles). For example, a cluster of particles with the highest quantity of particles among the one or more first clusters of particles may be considered to correspond to entities associated with bulk traffic (such as network traffic associated with popular internet resources).

In some examples, the one or more first conditions may comprise a second condition associated with a density of particles of the first cluster of particles. In some examples, the second condition may be met if particles of the first cluster of particles have a density exceeding a second threshold density.

In some examples, the one or more first conditions may comprise a third condition associated with one or more distances between the first cluster of particles and one or more other clusters of particles of the one or more first clusters of particles. In some examples, the third condition may be met if the one or more one or more distances between the first cluster of particles and the one or more other clusters of particles are larger than a second threshold distance.

In some examples, one or more other coalition networks associated with fraudulent activity may be identified based upon the one or more first clusters of particles, such as using one or more of the techniques described herein with respect to identifying the first coalition network.

In some examples, a graphical representation of at least one of the second arrangement of the plurality of particles, indications of the one or more first clusters (e.g., the indications may comprise one or more shapes, such as circles or other shapes, adjacent to and/or around the one or more first clusters), etc. may be generated. In some examples, the graphical representation may display one or more indications of one or more characteristics associated with the one or more first clusters, such as at least one of a classification of a cluster of the one or more first clusters (e.g., an indication that the cluster is determined to be associated with at least one of a coalition network, bulk traffic, background traffic, etc.), a density of particles of a cluster of the one or more first clusters of particles, a quantity of particles in a cluster of the one or more first clusters of particles, etc. In some examples, the graphical representation may be displayed via a fraud detection interface. For example, the fraud detection interface and/or the graphical representation may be used by a user (e.g., a system administrator) tasked with confirming that (and/or determining whether) a cluster of particles (identified as corresponding to a coalition network associated with fraudulent activity, for example) corresponds to entities of a coalition network. For example, in response to receiving (via the fraud detection interface, for example) an indication that entities, corresponding to a cluster of the one or more first clusters of particles, are confirmed to be (and/or determined to be) associated with fraudulent activity, the entities may be included in a list of fraudulent entities and/or the entities may be restricted from receiving one or more content items from the content system.

Figure 5H:
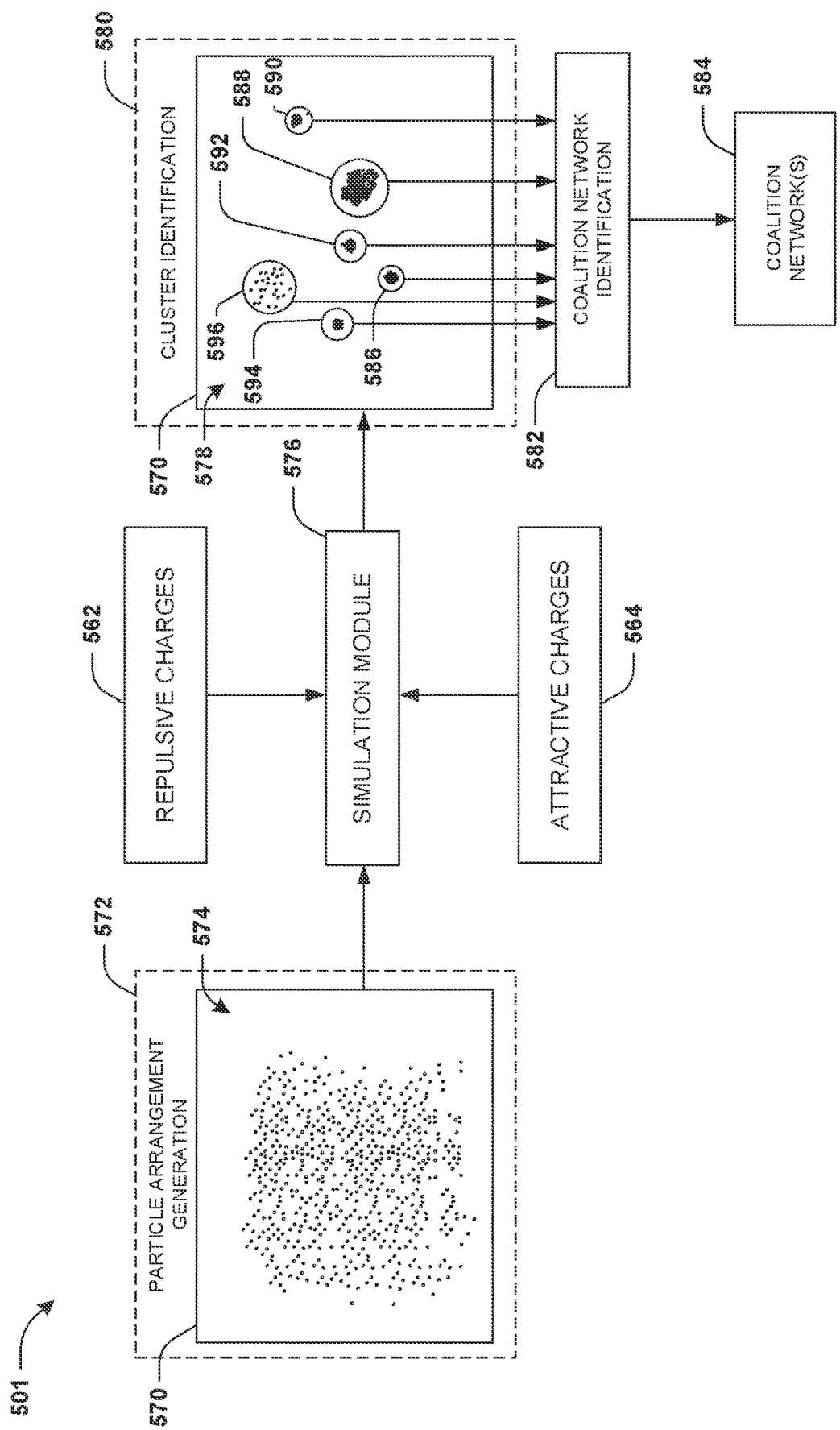
FIG. 5H is a component block diagram illustrating an example system for identifying coalition networks, where one or more coalition networks are identified.

FIG. 5H illustrates an exemplary scenario in which one or more coalition networks 584 are identified. In some examples, one or more particle arrangement generation operations 572 may be performed to generate the first arrangement (shown with reference number 574 in FIG. 5H) of the plurality of particles in the space (shown with reference number 570 in FIG. 5H). The first arrangement 574, the plurality of repulsive charges 562 and/or the plurality of attractive charges 564 may be input to a simulation module 576. The simulation module 576 may perform the simulation, such as using one or more of the techniques provided herein, to rearrange the plurality of particles into the second arrangement (shown with reference number 578 in FIG. 5H) of the plurality of particles. One or more cluster identification operations 580 may be performed, such as using one or more of the techniques provided herein, to identify clusters of particles comprising a cluster 586, a cluster 588, a cluster 590, a cluster 592, a cluster 594 and/or a cluster 596. In some examples, one or more coalition network identification operations 582 may be performed, such as using one or more of the techniques provided herein, to identify the one or more coalition networks 584. In some examples, entities corresponding to the cluster 588 may not be identified as a coalition network and/or may be identified as bulk traffic entities, such as based upon a determination that, among the clusters of particles, the cluster 588 comprises a highest quantity of particles. In some examples, entities corresponding to the cluster 596 may not be identified as a coalition network and/or may be identified as background entities, such as based upon a determination that a density of particles of the cluster 596 does not exceed the second threshold density. In some examples, the one or more coalition networks 584 may comprise a coalition network comprising entities corresponding to the cluster 586, a coalition network comprising entities corresponding to the cluster 590, a coalition network comprising entities corresponding to the cluster 592 and/or a coalition network comprising entities corresponding to the cluster 594 (e.g., such as based upon a determination that the one or more first conditions are met by the clusters 586, 590, 592 and/or 594 and/or entities corresponding to the clusters 586, 590, 592 and/or 594).

Figure 5I:
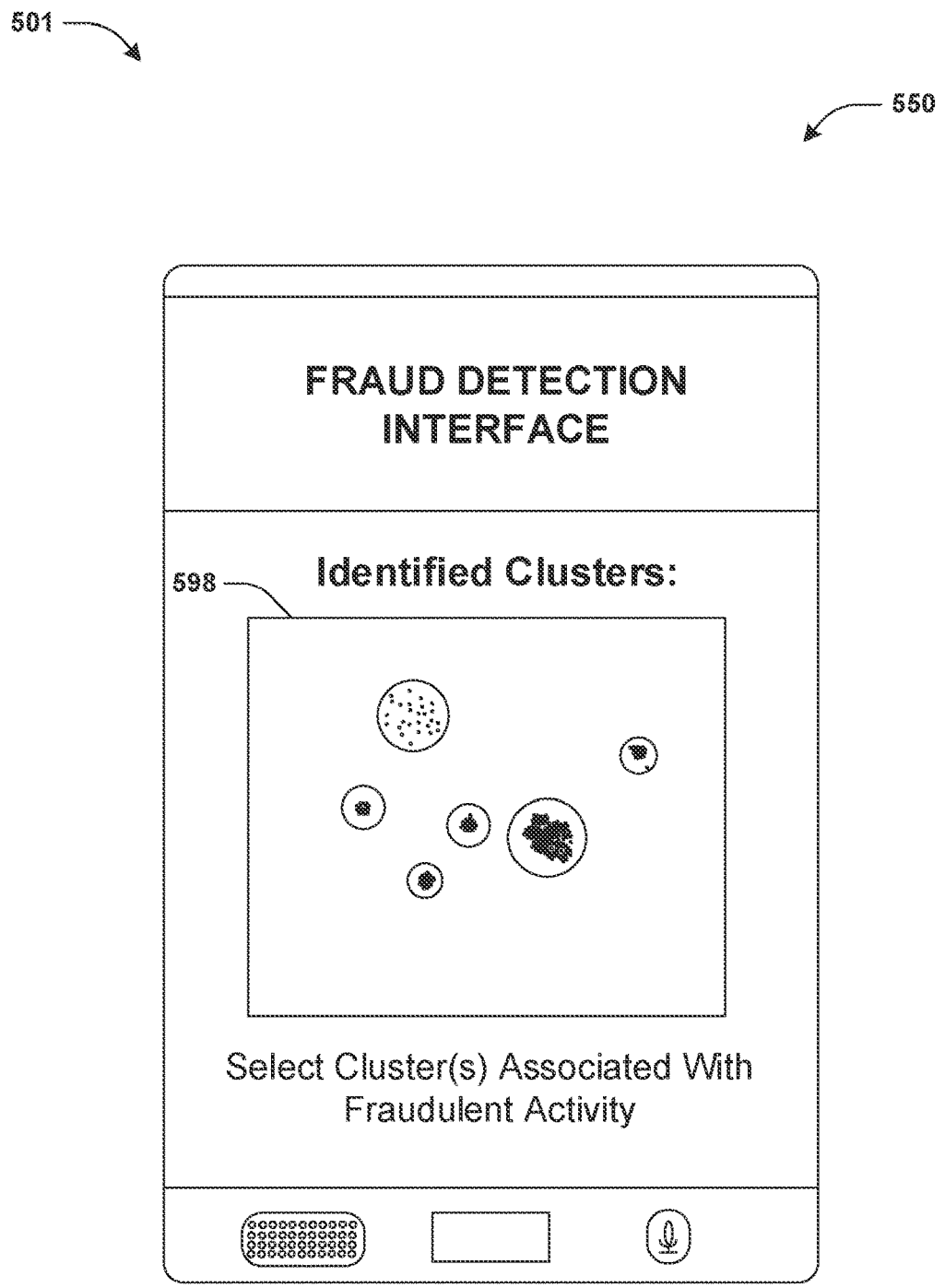
FIG. 5I is a component block diagram illustrating an example system for identifying coalition networks, where a graphical representation of a second arrangement of a plurality of particles is displayed.

FIG. 5I illustrates an example scenario in which the graphical representation (shown with reference number 598 in FIG. 5I) of the second arrangement 578 of the plurality of particles is displayed via a second client device 550. In an example, the second client device 550 may be a fraud detection management device. Alternatively and/or additionally, the graphical representation 598 may be displayed via the fraud detection interface. The graphical representation 598 may comprise indications of the clusters of particles of the second arrangement 578. For example, the indications of the clusters may comprise shapes (e.g., circles as shown in FIG. 5I, and/or other shapes) adjacent to and/or around (e.g., surrounding) the clusters. In some examples, the fraud detection interface may display one or more selectable inputs associated with classifying entities, corresponding to a cluster of particles, as being a coalition network associated with fraudulent activity. A coalition network of entities associated with fraudulent activity may be identified based upon reception of a selection of a selectable input associated with a cluster of particles corresponding to the entities. In an example, the one or more selectable inputs may comprise the indications of the clusters. For example, it may be determined that entities corresponding to a cluster of particles are part of a coalition network associated with fraudulent activity based upon a selection of an indication of the cluster of particles (such as a selection of a circle (or other shape) adjacent to and/or surrounding the cluster).

It may be appreciated that by determining the plurality of charges associated with the plurality of particles based upon the first network profile, and/or by performing the simulation based upon the plurality of charges (and/or one or more other parameters of the simulation such as the one or more simulation parameters), in the second arrangement, particles corresponding to entities that are less closely related to each other (with respect to at least one of events of the first plurality of events, weights of relationships between entities, etc., for example) may be further apart from each other than particles corresponding to entities that are more closely related to each other. Alternatively and/or additionally, in the second arrangement, particles corresponding to a network of entities (e.g., a coalition network) used for performing fraudulent activity may be close to each other and/or locally dense, and/or the particles may be separated and/or distant from other particles corresponding to entities that are not part of the network of entities used for performing fraudulent activity. Thus, a coalition network corresponding to the network of entities may be identified by identifying a cluster formed by the locally dense particles, while entities (e.g., non-fraudulent entities) that are not part of the network of entities may not be identified as being part of the coalition network, such as due to particles corresponding to the non-fraudulent entities being separate and/or distant from the cluster. The coalition network may be more accurately identified (such as by more accurately identifying entities that are part of the network of entities used for performing fraudulent activity and/or by more accurately distinguishing between the network of entities and other entities that are not part of the network of entities) in comparison to some systems that may identify entities that are related, but that do not demonstrate that the related entities are separate from non-fraudulent entities. In those systems, the related entities may be identified as a coalition network, which may cause a false-positive case in which a non-fraudulent entity that is not part of a coalition network is identified as being part of the coalition network due to one or more events having occurred in association with the non-fraudulent entity and one or more entities of the coalition network. As a result of the non-fraudulent entity being identified as being part of the coalition network, the content system may restrict the non-fraudulent entity from accessing content items and/or the content system may not provide content items in response to requests associated with the non-fraudulent entity, which may result in a reduction in user experience quality and/or a reduction in revenue. Accordingly, it may be necessary to use one or more of the techniques herein to accurately identify a coalition network associated with fraudulent activity without mistakenly identifying non-fraudulent entities as being part of the coalition network. Alternatively and/or additionally, in an example in which the graphical representation 598 of the second arrangement is generated and/or displayed, a cluster formed by particles corresponding to a network of entities (e.g., a coalition network) associated with fraudulent activity may be clearly separate from particles corresponding to entities that are not part of the network of entities, thus providing for a clear distinction (e.g., a more visually clear distinction) between entities of the network of entities associated with fraudulent activity and entities that are not a part of the network of entities. Accordingly, using the graphical representation 598, a user may more accurately determine and/or confirm that the network of entities corresponding to the particles in the cluster is a coalition network associated with fraudulent activity.

Figure 6A:
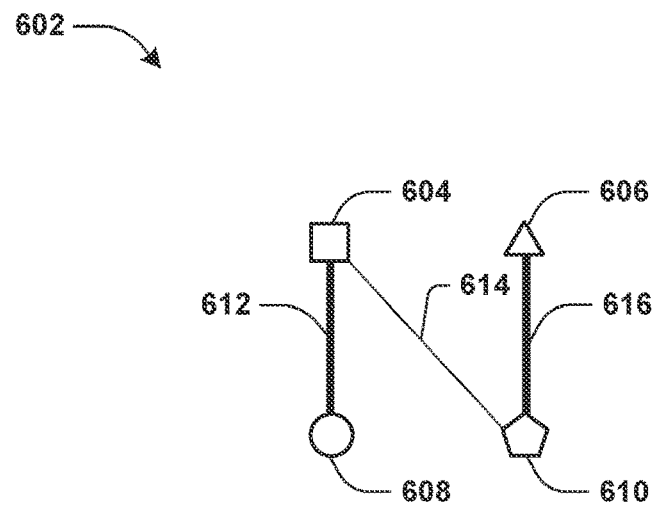
FIG. 6A is a component block diagram illustrating a representation of a network profile based upon which an exemplary simulation is performed.
Figure 6B:
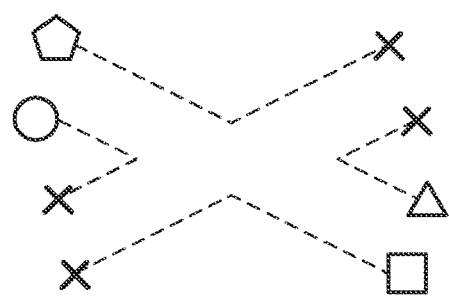
FIG. 6B is a component block diagram illustrating performance of an exemplary simulation.

FIGS. 6A-6B illustrate an exemplary simulation performed based upon a network profile according to some embodiments herein, such as embodiments of the simulation described with respect to the method 400 of FIG. 4 and/or the system 501 of FIGS. 5A-5I. FIG. 6A illustrates a representation 602 of the network profile (e.g., the representation 602 may correspond to a graph, such as a bipartite graph). The representation 602 and/or the network profile are associated with entities comprising entity 604, entity 606, entity 608 and/or entity 610. The entity 604 and/or the entity 606 may correspond to the first entity type (e.g., client-side entity). The entity 608 and/or the entity 610 may correspond to the second entity type (e.g., internet resource-side entity). A thickness of a first relationship line 612 between the entity 604 and the entity 608 is greater than a thickness of a second relationship line 614 between the entity 604 and the entity 610. The thickness of the first relationship line 612 being greater than the thickness of the second relationship line 614 may indicate that a weight of a relationship between the entity 604 and the entity 608 is greater than a weight of a relationship between the entity 604 and the entity 610. Alternatively and/or additionally, the thickness of the first relationship line 612 being greater than the thickness of the second relationship line 614 may be indicative of more events having occurred in association with the entity 604 and the entity 608 than in association with the entity 604 and the entity 610. A thickness of a third relationship line 616 between the entity 606 and the entity 610 is greater than the thickness of the second relationship line 614 between the entity 604 and the entity 610.

FIG. 6B illustrates performance of the exemplary simulation. The exemplary simulation may simulate motion of particles corresponding to the entities 604, 606, 608 and/or 610 based upon charges (e.g., repulsive charges and/or attractive charges) assigned to the particles. Examples of trajectories of motion of the particles in the simulation are shown with dashed lines, where initial positions of the particles are shown with shapes of the corresponding entities in FIG. 6A (e.g., a square indicates an initial position, in the exemplary simulation, of a particle corresponding to the entity 604, a triangle indicates an initial position, in the exemplary simulation, of a particle corresponding to the entity 606, a circle indicates an initial position, in the exemplary simulation, of a particle corresponding to the entity 608 and/or a pentagon indicates an initial position, in the exemplary simulation, of a particle corresponding to the entity 610) and final positions of the particles are shown with X marks. FIG. 6B shows that the final positions of particles corresponding to the entities 604 and 608 are closer to each other than the initial positions of the particles corresponding to the entities 604 and 610, such as based upon a second attractive charge assigned to the particles being associated with an attractive force, between the particles, that attract the particles towards each other. The final positions of particles corresponding to the entities 606 and 610 are closer to each other than the initial positions of the particles corresponding to the entities 604 and 610, such as based upon a third attractive charge assigned to the particles being associated with an attractive force, between the particles, that attract the particles towards each other. However, even though the relationship line 614 exists between the entity 604 and the entity 610, and a fourth attractive charge associated with an attractive force may be assigned to the entity 604 and the entity 610 (e.g., the fourth attractive charge may be determined and/or assigned to the entity 604 and the entity 610 based upon the weight of the relationship between the entity 604 and the entity 610 and/or based upon one or more events that occurred in association with the entity 604 and the entity 610, where the fourth attractive charge may be associated with an attractive force between the entity 604 and the entity 610), the final positions of particles corresponding to the entities 604 and 610 may be further apart than the initial positions of the particles corresponding to the entities 604 and 610, such as due to the fourth attractive charge being outweighed by one or more other forces on the particles. The one or more other forces may comprise one or more forces corresponding to the second attractive charge, the third attractive charge and/or one or more repulsive charges between particles in the exemplary simulation. For example, the second attractive charge may be greater than the fourth attractive charge based upon the weight of the relationship between the entity 604 and the entity 608 being greater than the weight of the relationship between the entity 604 and the entity 610 and/or based upon more events having occurred in association with the entity 604 and the entity 608 than in association with the entity 604 and the entity 610. Alternatively and/or additionally, the third attractive charge may be greater than the fourth attractive charge based upon the weight of the relationship between the entity 606 and the entity 610 being greater than the weight of the relationship between the entity 604 and the entity 610 and/or based upon more events having occurred in association with the entity 606 and the entity 610 than in association with the entity 604 and the entity 610.

In some examples, the content system may control transmission and/or reception of data (such as transmission of content items) based upon identification of a first coalition network, for example the first coalition network identified using one or more of the techniques described with respect to the method 400 of FIG. 4 and/or the system 501 of FIGS. 5A-5I.

In some examples, a first request for content associated with a first client device and/or a first internet resource may be received by the content system. For example, the first request for content may be a request for the content system to provide a content item (e.g., an advertisement, an image, a link, a video, etc.) for presentation via the first client device using the first internet resource.

In some examples, a first entity associated with the first client device and/or a second entity associated with the first internet resource may be determined based upon the first request for content. For example, the first request for content may comprise an indication of the first entity and/or the second entity. The first entity may correspond to at least one of the first client device, an IP address associated with the first client device, a carrier identifier indicative of carrier information associated with the first client device, a user identifier (e.g., at least one of a username, an email address, a user account identifier, etc.) associated with the first client device, a browser cookie, etc. The second entity may correspond to at least one of one or more first internet resources comprising the first internet resource, an internet resource identifier associated with the one or more first internet resources, a domain associated with the one or more first internet resources, a host identifier of a host device associated with the one or more first internet resources, a publisher identifier associated with a publisher of the one or more first internet resources, etc.

In some examples, the first coalition network may be analyzed based upon the first entity and/or the second entity to determine whether the first coalition network comprises the first entity and/or the second entity. In some examples, a content item associated with the first request for content may not be transmitted to the first client device based upon a determination that both the first entity and the second entity are part of the first coalition network. For example, the determination that both the first entity and the second entity are part of the first coalition network may correspond to a determination that the first entity and the second entity are being used together for performance of fraudulent activity, such as advertising fraud, and/or that reception of the first request for content is a result of such fraudulent activity.

In some examples, a content item associated with the first request for content may not be transmitted to the first client device based upon a determination that merely the first entity associated with the first client device is part of the first coalition network (and/or the second entity associated with the first internet resource is not part of the first coalition network). In some examples, device activity associated with the first client device may be analyzed to determine a first fraud level associated with the first entity. The device activity may comprise historical activity information indicative of historical events in which the first client device presented content items provided by the content system. In some examples, the first fraud level may be determined based upon a first activity level, of the first client device, with entities that are not part of an identified coalition network. In an example, the first activity level may be based upon a quantity of events performed by the first client device with entities that are not part of an identified coalition network. Alternatively and/or additionally, the first activity level may be based upon a rate at which events are performed by the first client device with entities that are not part of an identified coalition network.

In some examples, a lower level of the first activity level may correspond to a higher level of the first fraud level. For example, a determination that the first client device has a low activity level with entities that are not part of identified coalition networks may correspond to a high likelihood that the first client device is exclusively (and/or mainly) used for performance of fraudulent activity with entities of one or more coalition networks.

Alternatively and/or additionally, a higher level of the first activity level may correspond to a lower level of the first fraud level. For example, a determination that the first client device has a high activity level with entities that are not part of the identified coalition networks may correspond to a high likelihood that the first client device is not exclusively (and/or mainly) used for performance of fraudulent activity with entities of one or more coalition networks. For example, the first entity associated with the first client device may be included in the first coalition network due to a computer virus, malware, a botnet, a Trojan horse, etc. controlling the first client device perform fraudulent activity with entities of the first coalition network. However, other activity of the first client device that is not performed in association with entities of the first coalition network may not be fraudulent.

In some examples, responsive to a determination that merely the first entity associated with the first client device is part of the first coalition network (and/or the second entity associated with the first internet resource is not part of the first coalition network), the first fraud level associated with the first entity may be compared with a first threshold fraud level. A content item associated with the first request for content may not be transmitted to the first client device responsive to determining that the first fraud level associated with the first entity exceeds the first threshold fraud level. Alternatively and/or additionally, a content item associated with the first request for content may be selected (via a bidding process, for example) and/or transmitted to the first client device responsive to determining that the first fraud level associated with the first entity does not exceed the first threshold fraud level.

Alternatively and/or additionally, responsive to a determination that the first entity associated with the first client device is part of the first coalition network, a content item associated with the first request for content may be selected, based upon the first fraud level, for presentation via the first client device. For example, the first fraud level may be submitted to a bidding system. A plurality of bid values associated with a plurality of content items may be generated based upon the first fraud level. A content item may be selected from the plurality of content items for presentation via the first client device based upon the plurality of bid values, such as using one or more of the techniques described herein with respect to FIGS. 5A-5E. In a first example, the first fraud level may be equal to a first value and/or a first bid value, of the plurality of bid values, associated with a content item of the plurality of content items may be generated based upon the first value. In a second example, the first fraud level may be equal to a second value, lower than the first value, and/or a second bid value associated with the content item may be generated based upon the second value. The first bid value in the first example may be lower than the second bid value in the second example (as a result of the first fraud level in the first example being higher than the first fraud level in the second example).

In some examples, a content item associated with the first request for content may not be transmitted to the first client device based upon a determination that merely the second entity associated with the first internet resource is part of the first coalition network (and/or the first entity associated with the first client device is not part of the first coalition network). In some examples, historical activity associated with the one or more first internet resources (comprising the first internet resource) may be analyzed to determine a second fraud level associated with the second entity. The historical activity may be determined based upon historical activity information indicative of historical events in which the one or more first internet resources were used to present content items provided by the content system. In some examples, the second fraud level may be determined based upon a second activity level, of the one or more first internet resources, with entities that are not part of an identified coalition network. In an example, the second activity level may be based upon a quantity of events performed by the one or more first internet resources with entities that are not part of an identified coalition network. Alternatively and/or additionally, the second activity level may be based upon a rate at which events are performed by the one or more first internet resources with entities that are not part of an identified coalition network.

In some examples, a lower level of the second activity level may correspond to a higher level of the second fraud level. For example, a determination that the one or more first internet resources have a low activity level with entities that are not part of identified coalition networks may correspond to a high likelihood that the one or more first internet resources are exclusively (and/or mainly) used for performance of fraudulent activity with entities of one or more coalition networks.

Alternatively and/or additionally, a higher level of the second activity level may correspond to a lower level of the second fraud level. For example, a determination that the one or more first internet resources have a high activity level with entities that are not part of the identified coalition networks may correspond to a high likelihood that the first client device is not exclusively (and/or mainly) used for performance of fraudulent activity with entities of one or more coalition networks.

In some examples, responsive to a determination that merely the second entity associated with the first internet resource is part of the first coalition network (and/or the first entity associated with the first client device is not part of the first coalition network), the second fraud level associated with the second entity may be compared with a second threshold fraud level. A content item associated with the first request for content may not be transmitted to the first client device responsive to determining that the second fraud level associated with the second entity exceeds the second threshold fraud level. Alternatively and/or additionally, a content item associated with the second request for content may be selected (via a bidding process, for example) and/or transmitted to the first client device responsive to determining that the second fraud level associated with the second entity does not exceed the second threshold fraud level.

Alternatively and/or additionally, responsive to a determination that the second entity associated with the first internet resource is part of the first coalition network, a content item associated with the first request for content may be selected, based upon the second fraud level, for presentation via the first client device. For example, the second fraud level may be submitted to a bidding system. A plurality of bid values associated with a plurality of content items may be generated based upon the second fraud level. A content item may be selected from the plurality of content items for presentation via the first client device based upon the plurality of bid values, such as using one or more of the techniques described herein, such as with respect to FIG. 5D.

It may be appreciated that the disclosed subject matter may prevent fraudulent activity, including, but not limited to, advertising fraud. For example, employing one or more of the techniques presented herein, such as at least one of analyzing activity associated with entities on a network-level (such as analyzing the first plurality of sets of event information), generating the first network profile associated with entities based upon the first plurality of sets of event information, generating an arrangement of particles associated with the entities, determining charges (e.g., attractive charges and/or repulsive charges) associated with the particles based upon the first network profiles, rearranging the particles into a second arrangement of particles based upon the charges, identifying clusters based upon the particles, identifying coalition networks based upon the clusters, etc., results in accurate identification of coalition networks associated with fraudulent activity. The coalition networks identified using one or more of the techniques presented herein may include entities that otherwise may have gone undetected using other systems, such as systems that attempt to detect fraud at an entity-level and/or an event-level and/or systems that analyze activity and/or traffic associated with a device and/or an advertisement signal to determine, such as based upon computation limits, whether the device and/or the advertisement signal is fraudulent. For example, such systems may not detect fraudulent entities of a coalition network because each individual entity may be controlled to look and/or act sufficiently like a legitimate user. Accordingly, it may be necessary to use one or more of the techniques herein to identify the entity as associated with a coalition network associated with fraudulent activity. Thus, by implementing one or more of the techniques herein, it may be more difficult for a malicious entity to perform fraudulent activity without being detected.

Further, malicious entities may be discouraged from performing malicious actions (e.g., using one or more automated operation functionalities, hacking techniques, malware, etc.) to control client devices for transmission of advertisement requests because, by implementing one or more of the techniques presented herein, it is more difficult for a malicious entity to successfully control a client device for transmission of a fraudulent advertisement request without being detected as part of a coalition network.

Implementation of at least some of the disclosed subject matter may lead to benefits including, but not limited to, a reduction in transmission of fraudulent advertisement requests (and/or a reduction in bandwidth) (e.g., as a result of discouraging malicious entities from performing malicious actions to control client devices for transmission of advertisement requests).

Implementation of at least some of the disclosed subject matter may lead to benefits including, but not limited to, a reduction in transmission of content items based upon fraudulent advertisement requests (and/or a reduction in bandwidth) (e.g., as a result of identifying a coalition network associated with fraudulent activity, as a result of controlling transmission of data, such as content items and/or advertisements, to entities of the coalition network based upon the identification of the coalition network, etc.).

Alternatively and/or additionally, implementation of at least some of the disclosed subject matter may lead to benefits including preventing malicious entities from receiving compensation for performing fraudulent activity (e.g., as a result of identifying a coalition network associated with fraudulent activity, as a result of controlling transmission of data, such as content items and/or advertisements, to entities of the coalition network based upon the identification of the coalition network, etc.).

Alternatively and/or additionally, implementation of at least some of the disclosed subject matter may lead to benefits including a reduction in instances that client devices are hacked and/or controlled for transmission of fraudulent advertisement requests (e.g., as a result of discouraging malicious entities from performing malicious actions to control client devices for transmission of fraudulent advertisement requests).

Alternatively and/or additionally, implementation of at least some of the disclosed subject matter may lead to benefits including reducing unauthorized access of client devices and/or the content system from unauthorized access (e.g., as a result of discouraging malicious entities from performing malicious actions to control client devices for transmission of fraudulent advertisement requests and/or as a result of identifying a coalition network associated with fraudulent activity and/or controlling transmission of data, such as content items and/or advertisements, to entities of the coalition network based upon the identification of the coalition network). Alternatively and/or additionally, implementation of at least some of the disclosed subject matter may lead to benefits including decreasing security resources needed to protect client devices and/or the content system from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 7:
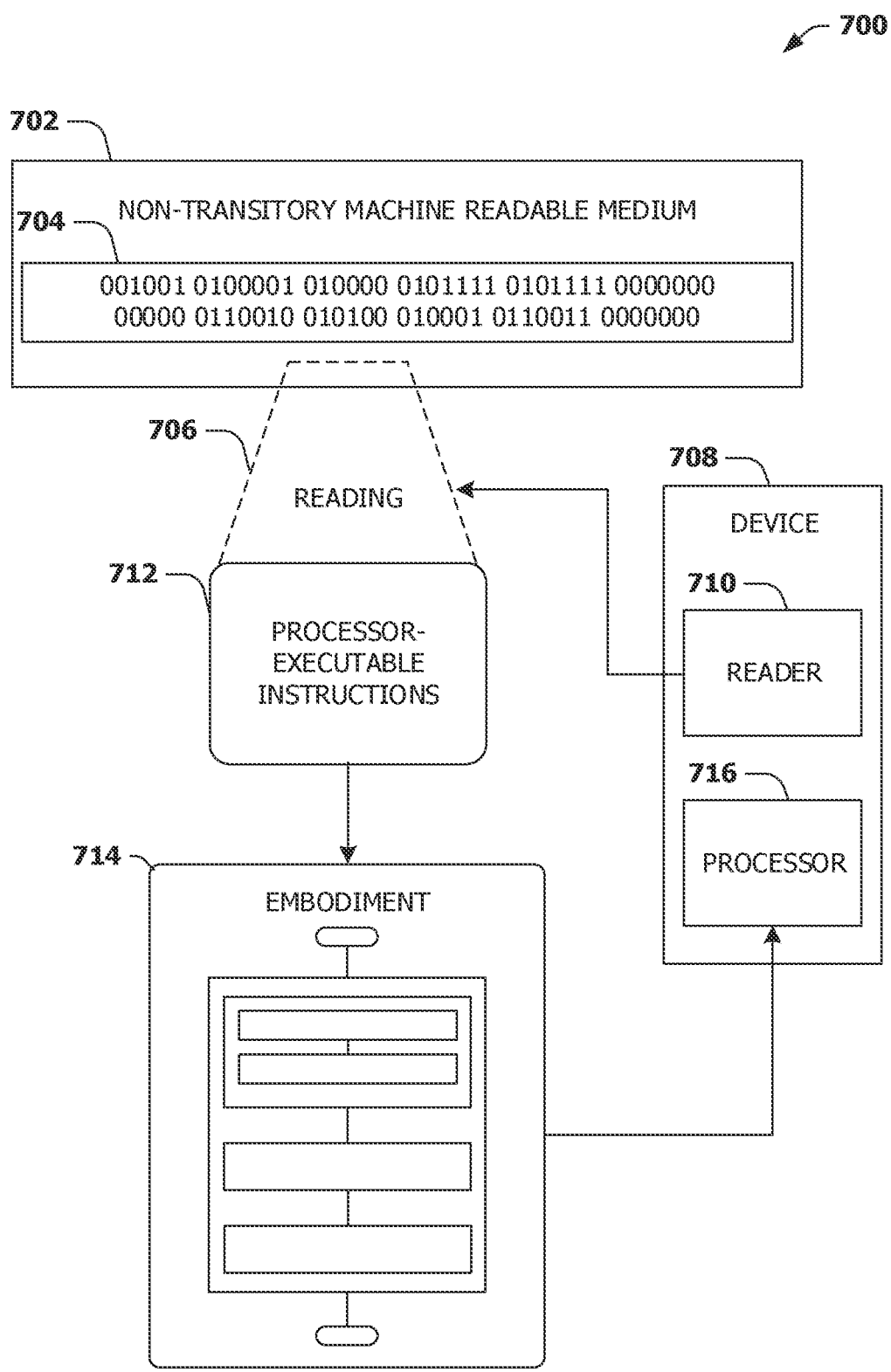
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the exemplary system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
identifying a first plurality of sets of event information associated with a first plurality of events, wherein:
the first plurality of events is associated with a first plurality of entities corresponding to a first entity type and a second plurality of entities corresponding to a second entity type;
a first set of event information of the first plurality of sets of event information is associated with a first event of the first plurality of events; and
the first set of event information is indicative of:
a first entity, of the first plurality of entities, associated with the first event; and
a second entity, of the second plurality of entities, associated with the first event;
generating, based upon the first plurality of sets of event information, a first network profile associated with the first plurality of entities and the second plurality of entities, wherein the first network profile is indicative of one or more first sets of event metrics associated with the first entity and one or more entities comprising the second entity, wherein:
the second plurality of entities comprises the one or more entities; and
a first set of event metrics of the one or more first sets of event metrics corresponds to a measure of events associated with the first entity and the second entity;
generating an arrangement of a plurality of particles in a space, wherein a first particle of the plurality of particles corresponds to the first entity of the first plurality of entities and a second particle of the plurality of particles corresponds to the second entity of the second plurality of entities;
determining, based upon the first network profile, a plurality of charges associated with the plurality of particles, wherein a first charge of the plurality of charges is assigned to the first particle of the plurality of particles and a second charge of the plurality of charges is assigned to the second particle of the plurality of particles, wherein the plurality of charges comprises:
a plurality of repulsive charges, assigned to particles of the plurality of particles, comprising the first charge and the second charge; and
a plurality of attractive charges associated with pairs of particles of the plurality of particles;
rearranging the plurality of particles based upon the plurality of charges to generate a second arrangement of the plurality of particles in the space;
identifying one or more first clusters of particles in the second arrangement of the plurality of particles in the space; and
identifying a coalition network associated with fraudulent activity based upon a first cluster of particles of the one or more first clusters of particles.

2. The method of claim 1, wherein:
the first charge is a first repulsive charge associated with a repulsive force between the first particle and particles, of the plurality of particles, different than the first particle; and
the determining the plurality of charges comprises determining the first charge based upon the one or more first sets of event metrics associated with the first entity.

3. The method of claim 1, wherein:
the first charge is a first attractive charge associated with an attractive force between the first particle and the second particle; and
the determining the plurality of charges comprises determining the first charge based upon the first set of event metrics associated with the first entity and the second entity.

4. The method of claim 1, wherein:
the first charge is a first repulsive charge associated with a repulsive force between the first particle and first particles, of the plurality of particles, different than the first particle;
the second charge is a second repulsive charge associated with a repulsive force between the second particle and second particles, of the plurality of particles, different than the second particle;
the plurality of attractive charges comprises a third charge assigned to a pair of particles comprising the first particle and the second particle;
the third charge is an attractive charge associated with an attractive force between the first particle and the second particle; and
the third charge is based upon the first set of event metrics associated with the first entity and the second entity.

5. The method of claim 1, wherein:
the rearranging the plurality of particles comprises performing a force simulation based upon the plurality of charges.

6. The method of claim 5, wherein:
the performing the force simulation is based upon a resistance corresponding at least one of a drag or a friction in the space.

7. The method of claim 5, wherein:
the performing the force simulation is based upon an initial velocity of particles of the plurality of particles.

8. The method of claim 1, wherein:
the coalition network comprises a first set of entities of the first plurality of entities and a second set of entities of the second plurality of entities; and
the identifying the coalition network is performed based upon a determination the first cluster of particles comprises particles corresponding to entities comprising the first set of entities and the second set of entities.

9. The method of claim 8, wherein a third entity of the first set of entities is associated with a first client device, the method comprising:

receiving a first request for content associated with the first client device; and not transmitting a content item, associated with the first request for content, to the first client device based upon a determination that the third entity is associated with the coalition network.

10. The method of claim 8, wherein a third entity of the second set of entities is associated with a first internet resource, the method comprising:

receiving a first request associated with a first client device, wherein the first request corresponds to a request for content to be presented via the first internet resource; and not transmitting a content item, associated with the first request for content, to the first client device based upon a determination that the third entity is associated with the coalition network.

11. The method of claim 8, wherein a third entity of the first set of entities is associated with a first client device and a fourth entity of the second set of entities is associated with a first internet resource, the method comprising:

receiving a first request associated with the first client device, wherein the first request corresponds to a request for content to be presented via the first internet resource; and not transmitting a content item, associated with the first request for content, to the first client device based upon a determination that the third entity and the fourth entity are associated with the coalition network.

12. The method of claim 1, wherein:

the identifying the one or more first clusters of particles comprises identifying the first cluster of particles based upon a determination that a first density of particles corresponding to the first cluster of particles exceeds a first threshold density.

13. The method of claim 1, wherein:

an event of the first plurality of events corresponds to at least one of:
  a presentation of a first content item via a first client device; or
  a selection of the first content item via the first client device.

14. The method of claim 1, wherein:

an entity of the first plurality of entities is associated with a client device; and an entity of the second plurality of entities is associated with an internet resource.

15. The method of claim 1, wherein:

the first set of event metrics is indicative of at least one of:
  a rate at which events associated with the first entity and the second entity occur; or
  a quantity of events associated with the first entity and the second entity.

16. A computing device comprising:

a processor; and memory comprising processor-executable instructions that when executed by the processor cause performance of operations, the operations comprising:

identifying a first plurality of sets of event information associated with a first plurality of events, wherein:
  the first plurality of events is associated with a first plurality of entities corresponding to a first entity type and a second plurality of entities corresponding to a second entity type;
  a first set of event information of the first plurality of sets of event information is associated with a first event of the first plurality of events; and
  the first set of event information is indicative of:
    a first entity, of the first plurality of entities, associated with the first event; and
    a second entity, of the second plurality of entities, associated with the first event;

generating, based upon the first plurality of sets of event information, a first network profile associated with the first plurality of entities and the second plurality of entities, wherein the first network profile is indicative of one or more first sets of event metrics associated with the first entity and one or more entities comprising the second entity, wherein:
  the second plurality of entities comprises the one or more entities; and
  a first set of event metrics of the one or more first sets of event metrics corresponds to a measure of events associated with the first entity and the second entity;

generating an arrangement of a plurality of particles in a space, wherein a first particle of the plurality of particles corresponds to the first entity of the first plurality of entities and a second particle of the plurality of particles corresponds to the second entity of the second plurality of entities;

determining, based upon the first network profile, a plurality of charges associated with the plurality of particles, wherein a first charge of the plurality of charges is assigned to the first particle of the plurality of particles and a second charge of the plurality of charges is assigned to the second particle of the plurality of particles, wherein the plurality of charges comprises:
  a plurality of repulsive charges, assigned to particles of the plurality of particles, comprising the first charge and the second charge; and
  a plurality of attractive charges associated with pairs of particles of the plurality of particles;

rearranging the plurality of particles based upon the plurality of charges to generate a second arrangement of the plurality of particles in the space;

identifying one or more first clusters of particles in the second arrangement of the plurality of particles in the space; and identifying a coalition network associated with fraudulent activity based upon a first cluster of particles of the one or more first clusters of particles.

17. The computing device of claim 16, wherein:

the first charge is a first repulsive charge associated with a repulsive force between the first particle and first particles, of the plurality of particles, different than the first particle;

the second charge is a second repulsive charge associated with a repulsive force between the second particle and second particles, of the plurality of particles, different than the second particle;

the plurality of attractive charges comprises a third charge assigned to a pair of particles comprising the first particle and the second particle;

the third charge is an attractive charge associated with an attractive force between the first particle and the second particle; and the third charge is based upon the first set of event metrics associated with the first entity and the second entity.

18. The computing device of claim 16, wherein:
the rearranging the plurality of particles comprises performing a force simulation based upon the plurality of charges.

19. The computing device of claim 16, wherein:
the coalition network comprises a first set of entities of the first plurality of entities and a second set of entities of the second plurality of entities; and
the identifying the coalition network is performed based upon a determination the first cluster of particles comprises particles corresponding to entities comprising the first set of entities and the second set of entities.

20. A non-transitory machine-readable medium having stored thereon processor-executable instructions that when executed cause performance of operations, the operations comprising:
identifying a first plurality of sets of event information associated with a first plurality of events, wherein:
the first plurality of events is associated with a first plurality of entities corresponding to a first entity type and a second plurality of entities corresponding to a second entity type;
a first set of event information of the first plurality of sets of event information is associated with a first event of the first plurality of events; and
the first set of event information is indicative of:
a first entity, of the first plurality of entities, associated with the first event; and
a second entity, of the second plurality of entities, associated with the first event;
generating, based upon the first plurality of sets of event information, a first network profile associated with the first plurality of entities and the second plurality of entities, wherein the first network profile is indicative of one or more first sets of event metrics associated with the first entity and one or more entities comprising the second entity, wherein:
the second plurality of entities comprises the one or more entities; and
a first set of event metrics of the one or more first sets of event metrics corresponds to a measure of events associated with the first entity and the second entity;
generating an arrangement of a plurality of particles in a space, wherein a first particle of the plurality of particles corresponds to the first entity of the first plurality of entities and a second particle of the plurality of particles corresponds to the second entity of the second plurality of entities;
determining, based upon the first network profile, a plurality of charges associated with the plurality of particles, wherein a first charge of the plurality of charges is assigned to the first particle of the plurality of particles and a second charge of the plurality of charges is assigned to the second particle of the plurality of particles, wherein the plurality of charges comprises:
a plurality of repulsive charges, assigned to particles of the plurality of particles, comprising the first charge and the second charge; and
a plurality of attractive charges associated with pairs of particles of the plurality of particles;
rearranging the plurality of particles based upon the plurality of charges to generate a second arrangement of the plurality of particles in the space;
identifying one or more first clusters of particles in the second arrangement of the plurality of particles in the space; and
generating a graphical representation of the second arrangement of the plurality of particles, wherein the graphical representation comprises indications of the one or more first clusters of particles.

\* \* \* \* \*